US009607254B2

(12) United States Patent
Kawai

(10) Patent No.: US 9,607,254 B2
(45) Date of Patent: Mar. 28, 2017

(54) IMAGE RECORDING APPARATUS, SERVER, AND COMMUNICATION SYSTEM

(71) Applicant: Brother Kogyo Kabushiki Kaisha, Nagoya-shi, Aichi-ken (JP)

(72) Inventor: Sunao Kawai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/087,467

(22) Filed: Mar. 31, 2016

(65) Prior Publication Data

US 2016/0292550 A1    Oct. 6, 2016

(30) Foreign Application Priority Data

Mar. 31, 2015  (JP) ................................ 2015-073934
Jan. 19, 2016  (JP) ................................ 2016-007709

(51) Int. Cl.
*G06F 15/00* (2006.01)
*G06F 3/12* (2006.01)
(Continued)

(52) U.S. Cl.
CPC ........ *G06K 15/402* (2013.01); *B41J 2/17546* (2013.01); *G03G 15/0863* (2013.01); *G03G 15/553* (2013.01); *G06K 15/102* (2013.01)

(58) Field of Classification Search
CPC ............... G06K 15/402; G06K 15/102; G03G 15/0863; G03G 15/553; B41J 2/17546
(Continued)

(56) References Cited

U.S. PATENT DOCUMENTS 7,773,889 B2   8/2010   Okamura et al.
8,011,746 B2   9/2011   Sugahara et al.
(Continued)

FOREIGN PATENT DOCUMENTS

EP         1938995 A2    7/2008
JP      2002-099594 A    4/2002
(Continued)

OTHER PUBLICATIONS

Sep. 2, 2016—(EP) Partial European Search Report—App 16162974.6.
Jan. 2, 2017—(EP) Extended Search Report—App 16162974.6.

*Primary Examiner* — Douglas Tran
(74) *Attorney, Agent, or Firm* — Banner & Witcoff, Ltd.

(57) ABSTRACT

An image recording apparatus includes a controller configured to control an image recorder to execute a recording processing in a first mode or a second mode. In the first mode, the controller controls the image recorder to execute the recording processing when a specific-type cartridge has not been connected to a connecting portion and controls the image recorder not to execute the recording processing when the specific-type cartridge has been connected to the connecting portion. In the second mode, the controller controls the image recorder to execute the recording processing in any of a case where the specific-type cartridge has not been connected to the connecting portion and a case where the specific-type cartridge has been connected to the connecting portion. The controller stores first recording information relating to the recording processing executed when the specific-type cartridge has been connected to the connecting portion.

17 Claims, 18 Drawing Sheets

(51) Int. Cl.
*G06K 1/00* (2006.01)
*G06K 15/00* (2006.01)
*G06K 15/10* (2006.01)
*B41J 2/175* (2006.01)
*G03G 15/08* (2006.01)
*G03G 15/00* (2006.01)

(58) Field of Classification Search
USPC ............................. 358/1.1, 1.15, 1.13, 1.14
See application file for complete search history.

(56) References Cited

U.S. PATENT DOCUMENTS

| | | | |
|---|---|---|---|
| 8,027,048 B2 | 9/2011 | Testardi et al. | |
| 8,474,938 B2 | 7/2013 | Rice et al. | |
| 2002/0054340 A1* | 5/2002 | Tokutomi | B41J 2/17533 |
| | | | 358/1.15 |
| 2002/0077979 A1 | 6/2002 | Nagata | |
| 2003/0020951 A1* | 1/2003 | Minowa | B41J 2/17566 |
| | | | 358/1.15 |
| 2005/0254840 A1 | 11/2005 | Saisu et al. | |
| 2008/0174618 A1 | 7/2008 | Sugahara et al. | |
| 2009/0028582 A1 | 1/2009 | Okamura et al. | |
| 2009/0109255 A1 | 4/2009 | Rice et al. | |
| 2011/0234656 A1* | 9/2011 | Mizutani | G06Q 10/08 |
| | | | 347/6 |
| 2012/0019576 A1 | 1/2012 | Rice et al. | |
| 2012/0027423 A1 | 2/2012 | Kawai | |
| 2012/0249625 A1 | 10/2012 | Asada | |

FOREIGN PATENT DOCUMENTS

| | | |
|---|---|---|
| JP | 2007-011813 A | 1/2007 |
| JP | 2008-257081 A | 10/2008 |
| JP | 2011-500391 A | 1/2011 |

\* cited by examiner

IMAGE RECORDING APPARATUS, SERVER, AND COMMUNICATION SYSTEM

CROSS REFERENCE TO RELATED APPLICATION

The present application is based on Japanese Patent Application Nos. 2015-073934 filed on Mar. 31, 2015, and 2016-007709 filed on Jan. 19, 2016, the disclosures of which are incorporated herein by reference.

BACKGROUND

Technical Field

The following disclosure relates to an image recording apparatus configured to execute a recording processing for recording an image on a recording sheet, a server configured to communicate with the image recording apparatus, and a communication system including the image recording apparatus and the server.

Description of the Related Art

There are known image recording apparatuses configured to cause a recording material to adhere to a recording sheet to record an image. When using such an image recording apparatus, users need to purchase and manage consumable items such as cartridges storing the recording material. Operations such as the purchase and management of the consumable items are troublesome for the users. To solve this problem, a consumable-item delivery service is provided at a fixed-price. There is known a technique in which a server is provided so as to be connected to an image recording apparatus over a network to manage consumable items and recording information, for example.

SUMMARY

In the above-described technique, the image recording apparatus and the server have to be always connected to each other over the network. However, users desire that an appropriate service is provided, and consumable items and recording information relating to a recording processing in the image recording apparatus are appropriately managed even if communication between the image recording apparatus and the server is interrupted. Accordingly, an aspect of the disclosure relates to an image recording apparatus, a server, and a communication system.

In one aspect of the disclosure, an image recording apparatus includes: an image recorder configured to cause a recording material to adhere to a recording sheet to record an image; a connecting portion to which at least one cartridge filled with the recording material is to be removably connected, the at least one cartridge each being provided with a storage medium storing identification information relating to each of the at least one cartridge; a reader configured to read the identification information stored in the storage medium provided on each of the at least one cartridge connected to the connecting portion; a storage; and a first controller. The first controller is configured to perform: controlling the image recorder to execute a recording processing selectively in one of a first mode and a second mode different from the first mode; determining whether a specific-type cartridge has been connected to the connecting portion, based on the identification information relating to each of the at least one cartridge which is read by the reader; in the first mode, controlling the image recorder to execute the recording processing when the first controller determines that the specific-type cartridge has not been connected to the connecting portion and controlling the image recorder not to execute the recording processing when the first controller determines that the specific-type cartridge has been connected to the connecting portion; in the second mode, controlling the image recorder to execute the recording processing in any of a case where the first controller determines that the specific-type cartridge has not been connected to the connecting portion and a case where the first controller determines that the specific-type cartridge has been connected to the connecting portion; and storing, into the storage, first recording information relating to the recording processing executed when the first controller determines that the specific-type cartridge has been connected to the connecting portion.

In another aspect of the disclosure, a server includes: a second communication device configured to communicate with an information processor and an image recording apparatus that includes a connecting portion and that executes a recording processing for recording an image on a recording sheet with a recording material stored in a cartridge connected to the connecting portion; and a second controller. The image recording apparatus is configured to perform: executing the recording processing selectively in one of a first mode and a second mode different from the first mode; in the first mode, executing the recording processing when a specific-type cartridge has not been connected to the connecting portion and not executing the recording processing when the specific-type cartridge has been connected to the connecting portion; and in the second mode, executing the recording processing in any of a case where the specific-type cartridge has not been connected to the connecting portion and a case where the specific-type cartridge has been connected to the connecting portion. The second controller is configured to perform: controlling the second communication device to receive user information for identifying a user, from one of the information processor and the image recording apparatus; controlling the second communication device to receive identification information for identifying the image recording apparatus, from one of the information processor and the image recording apparatus; in response to receiving the user information and the identification information, controlling the second communication device to transmit a switch instruction to the image recording apparatus, the switch instruction instructing a switch of a mode of the image recording apparatus identified by the identification information, from the first mode to the second mode; and outputting an instruction for sending the specific-type cartridge to the user identified by the received user information, when the second controller receives a response to the transmitted switch instruction, from the image recording apparatus via the second communication device.

In another aspect of the disclosure, a server includes: a second communication device configured to communicate with an information processor and an image recording apparatus that includes a connecting portion and that executes a recording processing for recording an image on a recording sheet with a recording material stored in a cartridge connected to the connecting portion; and a second controller configured to perform: controlling the second communication device to receive user information for identifying a user, from one of the information processor and the image recording apparatus; controlling the second communication device to receive identification information for identifying the image recording apparatus, from one of the information processor and the image recording apparatus; controlling the second communication device to transmit a program in response to receiving the user information and the identification information, the program causing an image recorder of the image recording apparatus identified by the identification information, to execute the recording processing regardless of whether a specific-type cartridge has been connected to the connecting portion of the image recording apparatus, the program causing the image recording apparatus to store recording information into a storage of the image recording apparatus, the recording information relating to the recording processing executed when the specific-type cartridge has been connected to the connecting portion of the image recording apparatus; and outputting an instruction for sending the specific-type cartridge to the user identified by the received user information, when the second controller receives a response to the transmitted program, from the image recording apparatus via the second communication device.

In another aspect of the disclosure, a communication system includes: an image recording apparatus including (i) an image recorder configured to cause a recording material to adhere to a recording sheet to record an image, (ii) a connecting portion to which at least one cartridge filled with the recording material is to be removably connected, (iii) a first communication device configured to communicate with a server, (iv) a storage, and (v) a first controller; and the server including a second controller and a second communication device configured to communicate with an information processor and the image recording apparatus. The first controller is configured to perform: controlling the image recorder to execute a recording processing selectively in one of a first mode and a second mode different from the first mode; in the first mode, controlling the image recorder to execute the recording processing when a specific-type cartridge has not been connected to the connecting portion and controlling the image recorder not to execute the recording processing when the specific-type cartridge has been connected to the connecting portion; in the second mode, controlling the image recorder to execute the recording processing in any of a case where the specific-type cartridge has not been connected to the connecting portion and a case where the specific-type cartridge has been connected to the connecting portion; and controlling the first communication device to transmit identification information relating to the image recording apparatus to the server. The second controller is configured to perform: controlling the second communication device to receive user information for identifying a user, from one of the information processor and the image recording apparatus; controlling the second communication device to receive the identification information transmitted from one of the information processor and the image recording apparatus; in response to receiving the user information and the identification information, controlling the second communication device to transmit a switch instruction to the image recording apparatus, the switch instruction instructing a switch of a mode of the image recording apparatus from the first mode to the second mode; and outputting an instruction for sending the specific-type cartridge to the user identified by the received user information, when the second controller receives a response to the transmitted switch instruction, from the image recording apparatus via the second communication device. The first controller is configured to perform: controlling the image recorder to execute the recording processing in the first mode in a state in which the switch instruction is not received from the server; and controlling the image recorder to execute the recording processing in the second mode when the switch instruction is received from the server.

In another aspect of the disclosure, a communication system includes: an image recording apparatus including (i) an image recorder configured to cause a recording material to adhere to a recording sheet to record an image, (ii) a connecting portion to which at least one cartridge filled with the recording material is to be removably connected, (iii) a first communication device configured to communicate with a server, (iv) a storage, and (v) a first controller; and the server including a second controller and a second communication device configured to communicate with an information processor and the image recording apparatus. The first controller is configured to control the first communication device to transmit identification information relating to the image recording apparatus to the server. The second controller is configured to perform: controlling the second communication device to receive user information for identifying a user, from one of the information processor and the image recording apparatus; controlling the second communication device to receive the identification information transmitted from one of the information processor and the image recording apparatus; controlling the second communication device to transmit a program in response to receiving the user information and the identification information, the program causing the image recorder of the image recording apparatus identified by the identification information, to execute the recording processing regardless of whether a specific-type cartridge has been connected to the connecting portion of the image recording apparatus, the program causing the image recording apparatus to store recording information into the storage of the image recording apparatus, the recording information relating to the recording processing executed when the specific-type cartridge has been connected to the connecting portion of the image recording apparatus; and outputting an instruction for sending the specific-type cartridge to the user identified by the received user information, when the second controller receives a response to the transmitted program, from the image recording apparatus via the second communication device. The first controller is configured to perform: controlling the first communication device to receive the program transmitted from the server; and installing the received program.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

First Embodiment

Configuration of Communication System

Figure 1:
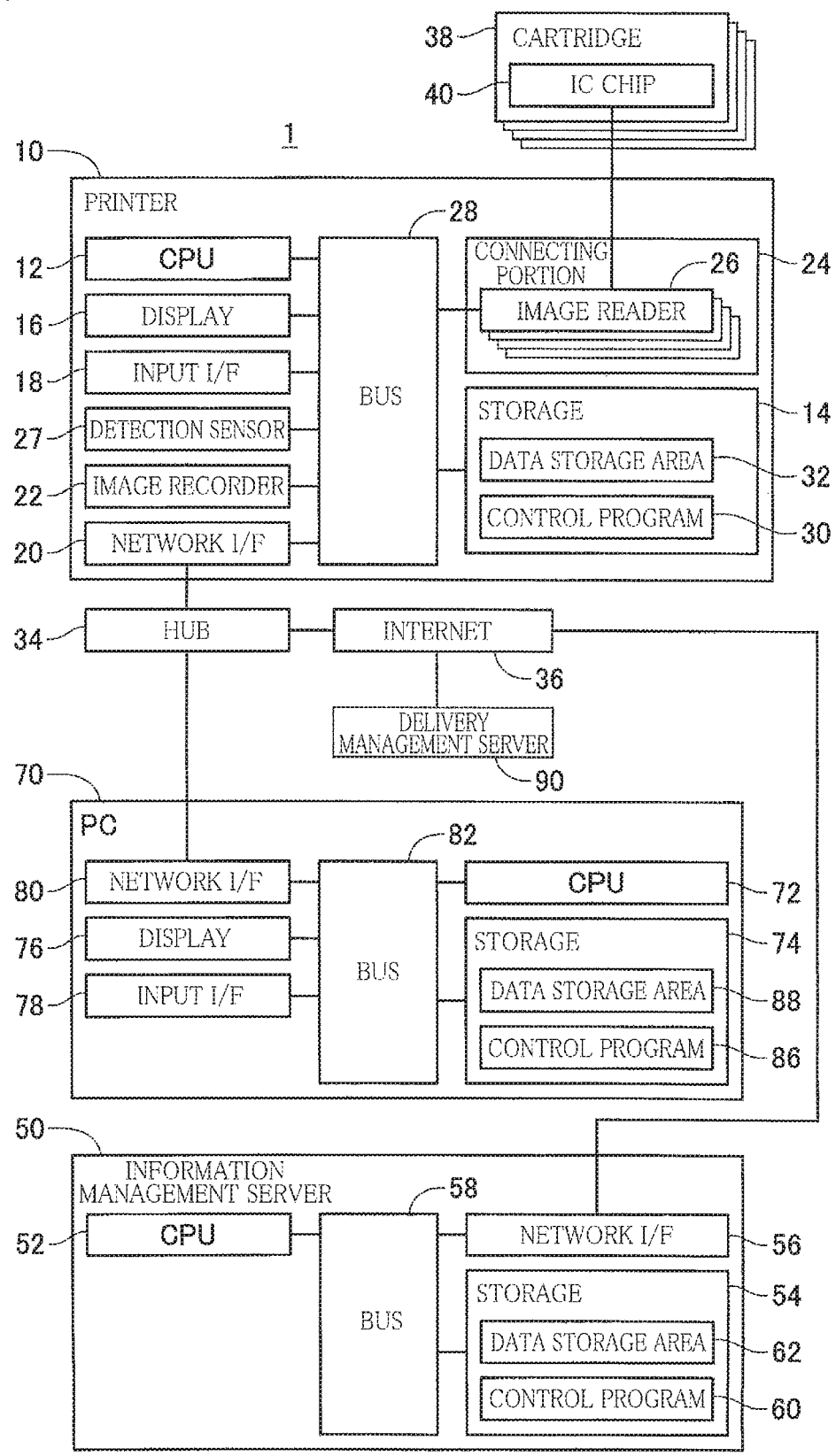
FIG. 1 is a block diagram illustrating a communication system.

Hereinafter, there will be described embodiments by reference to the drawings. FIG. 1 illustrates a communication system 1 according to embodiments. The communication system 1 includes a printer 10 (as one example of an image recording apparatus), an information management server 50 (as one example of a server), a personal computer (PC) 70 (as one example of an information processor), and a delivery management server 90.

The printer 10 includes the central processing unit (CPU) 12 (as one example of a first controller), a storage 14, a display 16, an input interface 18, a network interface 20 (as one example of a first communication device), an image recorder 22, a connecting portion 24, an image reader 26, and a detection sensor 27. These devices are communicable with each other by a bus 28.

The CPU 12 executes processings according to a control program 30 stored in the storage 14. According to this control program 30, the printer 10 executes a print processing. It is noted that the storage 14 is constituted by a combination of a random access memory (RAM), a read only memory (ROM), a flash memory, a hard disk (HDD), a buffer provided for the CPU 12, and other similar devices. The storage 14 has a data storage area 32 as one example of a storage. The data storage area 32 stores various kinds of data and information required for execution of the control program 30.

The display 16 selectively displays one of various screens in accordance with input image data. Examples of the display 16 include a liquid crystal display (LCD) and an organic EL display. The input interface 18 includes keys for implementation of the functions of the printer 10. One example of the input interface 18 is a touch screen provided integrally with the display 16. In this case, the input interface 18 accepts a user operation performed on an icon displayed on the display 16. Other examples of the input interface 18 include hardware keys.

The network interface 20 communicates with external devices. The network interface 20 is connected to the PC 70 via a hub 34 functioning as a router. The network interface 20 is connected to the information management server 50 and the delivery management server 90 via the hub 34 and the Internet 36. With this configuration, the printer 10 is capable of carrying out data communication with the information management server 50 and other devices via the network interface 20.

The image recorder 22 is a printing mechanism such as an ink-jet head. The CPU 12 inputs drive signals to the image recorder 22. In the case where the image recorder 22 is an ink-jet head, the ink-jet head ejects ink from its nozzles based on the input drive signals. The connecting portion 24 is provided in a housing of the printer 10. A plurality of cartridges 38 filled with ink of different colors to be used by the image recorder 22 are connectable to the connecting portion 24. In the present embodiment, the cartridges 38 can respectively store cyan ink, magenta ink, yellow ink, and black ink. An IC chip 40 is attached to each cartridge 38. This IC chip 40 stores identification information for identifying the cartridge 38 (as one example of first identification information). In the present embodiment, the identification information contains a product name, a model number, and a model name of the cartridge. The identification information varies by a type of the cartridge. Also, the identification information varies by ink color. It is noted that types of the cartridges include a specific cartridge to be used in the fixed-price print processing which will be described below and a cartridge to be used in a normal print processing. The image reader 26 is provided at the connecting portion 24 to read the identification information from the IC chip 40 attached to the cartridge 38 connected to the connecting portion 24. The detection sensor 27 detects a remaining amount of ink stored in the cartridge 38 connected to the connecting portion 24.

The information management server 50 includes a CPU 52 (as one example of a second controller), a storage 54, and a network interface 56 (as one example of a second communication device). These devices are communicable with each other by a bus 58.

The CPU 52 executes processings according to a control program 60 stored in the storage 54. According to this control program 60, the information management server 50 manages information about the print processing executed by the printer 10. It is noted that the storage 54 is constituted by a combination of a RAM, a ROM, a flash memory, a HDD, a buffer provided for the CPU 52, and other similar devices. The storage 54 has a data storage area 62. The data storage area 62 stores: information about the print processing executed by the printer 10; and various kinds of data and information required for execution of the control program 60.

The network interface 56 communicates with external devices. The network interface 56 is connected to the delivery management server 90 via the Internet 36. The network interface 56 is connected to the printer 10 and the PC 70 via the hub 34 and the Internet 36. With this configuration, the information management server 50 is capable of carrying out data communication with the printer 10, the PC 70, and the delivery management server 90 via the network interface 56.

The PC 70 includes a CPU 72, a storage 74, a display 76, an input interface 78, and a network interface 80. These devices are communicable with each other by a bus 82.

The CPU 72 executes processings according to a control program 86 stored in the storage 74. According to this control program 86, the PC 70 executes processings for a contract of a fixed-price print processing which will be explained below. It is noted that the storage 74 is constituted by a combination of a RAM, a ROM, a flash memory, an HDD, a buffer provided for the CPU 72, and other similar devices. The storage 74 has a data storage area 88. The data storage area 88 stores various kinds of data and information required for execution of the control program 86.

The display 76 selectively displays one of various screens in accordance with input image data. Examples of the display 76 include an LCD and an organic EL display. The input interface 78 includes keys for implementation of the functions of the PC 70. One example of the input interface 78 is hardware keys such as a keyboard and a mouse. Another example of the input interface 78 is a touch screen provided integrally with the display 76. In this case, the input interface 78 accepts a user operation performed on an icon displayed on the display 76.

The network interface 80 communicates with external devices. The network interface 80 is connected to the printer 10 via the hub 34. The network interface 80 is connected to the information management server 50 and the delivery management server 90 via the hub 34 and the Internet 36. With this configuration, the PC 70 is capable of carrying out data communication with the information management server 50 and other devices via the network interface 80.

Fixed-Price Print Processing in Communication System

The printer 10 is capable of executing the fixed-price print processing. In the fixed-price print processing, the print processing can be executed for a predetermined number of sheets at the fixed cost for each particular period within a contract period. Specifically, a user makes a contract of the fixed-price print processing at a particular price, with a maker providing a service of the fixed-price print processing, and the maker sends the specific cartridge to the user, for example. It is noted that the printer 10 in advance acquires information relating to the remaining amount of ink stored in the cartridge and transmits the information relating to the remaining amount of ink to the information management server 50. The information management server 50 manages the cartridges being used in the printer 10 based on the received information. When an amount of the ink stored in the cartridge used in the printer 10 becomes lower than a threshold value, the information management server 50 outputs an instruction for sending a new specific cartridge to the user of the printer 10. This instruction is output without limitation, that is, this instruction is output every time when the amount of ink becomes lower than the threshold value. The printer 10 can execute the print processing for, e.g., up to 200 sheets using the specific cartridge during one month. In the case where the print processing is executed for greater than 200 sheets, the user has to pay an additional charge in addition to the above-described price.

The maker sends the cartridge specific to the fixed-price print processing (as one example of a specific-type cartridge) after the contract of the fixed-price print processing is made. Thus, a certain period is required before the user receives the specific cartridge after the contract of the fixed-price print processing is made. In this period, the user cannot use the fixed-price print processing. That is, the printer 10 (the user) waits for start of the service of the fixed-price print processing (noted that this state may be hereinafter referred to as "waiting state") in a period from a time point when the contract of the fixed-price print processing is made to a time point when the specific cartridge is connected to the connecting portion 24 by the user having received the specific cartridge. When the specific cartridge is connected to the connecting portion 24, the printer 10 (the user) can use the service of the fixed-price print processing (noted that this state may be hereinafter referred to as "service ON state") and executes the fixed-price print processing. It is noted that the above-described particular period starts when the specific cartridge is connected to the connecting portion 24 for the first time.

The printer 10 is capable of also executing the normal print processing instead of the fixed-price print processing. In the normal print processing, the print processing is executed not using the specific cartridge delivered according to the contract of the fixed-price print processing but a normal cartridge connected to the connecting portion 24 which is attached to the printer 10 or commercially available in a retail store, for example.

The printer 10 executes the normal print processing and the fixed-price print processing in different operation modes. Hereinafter, the operation mode during execution of the normal print processing may be hereinafter referred to as "first mode", and the operation mode during execution of the fixed-price print processing may be hereinafter referred to as "second mode". In the first mode, when the specific cartridge is connected to the connecting portion 24, the printer 10 is disabled to execute the print processing, and only when the normal commercial cartridge is connected to the connecting portion 24 (that is, when the specific cartridge is not connected to the connecting portion 24), the printer 10 is permitted to execute the print processing. This setting is for preventing execution of an illicit print processing. As one example of the illicit print processing, a user not having made a contract of the fixed-price print processing illicitly obtains the specific cartridge and instructs the printer 10 to execute the print processing using the specific cartridge. To prevent such an operation, the printer 10 is operated in the first mode in the normal print processing.

To prevent execution of the illicit print processing, the printer 10 is disabled to execute the print processing when even one specific cartridge is connected to the connecting portion 24. That is, in the first mode, the printer 10 is permitted to execute the print processing only when all the cartridges connected to the connecting portion 24 are the normal cartridges. Determination of whether any one of the specific cartridge and the normal cartridge is connected to the connecting portion 24 is executed based on the identification information read by the image reader 26.

In the second mode in which the fixed-price print processing is permitted to be executed, the user has already paid a charge to make a contract of the fixed-price print processing. Thus, the printer 10 is permitted to execute the fixed-price print processing in the state in which the specific cartridge is connected to the connecting portion 24. Since the print processing is permitted to be executed for up to the predetermined number of sheets at the fixed cost in the fixed-price print processing, the printer 10 counts the number of sheets printed in the print processing in the state in which the specific cartridge is connected to the connecting portion 24. It is noted that the counted number of printed sheets may be reset by the printer 10 each time when the particular period is reached, and the number of printed sheets may be cumulatively counted by the printer 10 without reset even when the particular period is reached. In the case where the number of printed sheets is cumulatively counted, the information management server 50 may calculate the number of printed sheets in the latest particular period by subtracting the cumulative number of printed sheets in a particular period just before the latest particular period, from the latest cumulative number of printed sheets.

In the second mode, the print processing is permitted even when all the cartridges connected to the connecting portion 24 are normal commercial cartridges. This is for reducing a financial load of the user. Even in the contract period in the fixed-price print processing, specifically, in the case where the print processing is executed for greater than the predetermined number of sheets, the user is charged for the print processing for each sheet exceeding the predetermined number of sheets. Thus, in the second mode, the printer 10 is permitted to execute the print processing even in the case where all the specific cartridges are removed from the connecting portion 24, and only the normal cartridges are connected to the connecting portion 24. The sheets printed in the print processing in the case where only the normal cartridges are connected to the connecting portion 24 are not counted for the number of printed sheets in the fixed-price print processing. With this configuration, the user can avoid a charge for the print processing that is executed after the predetermined number of sheets is exceeded in the fixed-price print processing, resulting in reduction in the financial load of the user. That is, in the second mode, the print processing is executed regardless of the type of the cartridges connected to the connecting portion 24, but only the sheets printed in the print processing in the state in which the specific cartridge or cartridges are connected to the connecting portion 24 are counted for the number of printed sheets in the fixed-price print processing. There will be next explained, with reference to FIGS. 2-6, a method of the contract of the fixed-price print processing, the fixed-price print processing, and the normal print processing in detail.

Figure 7:
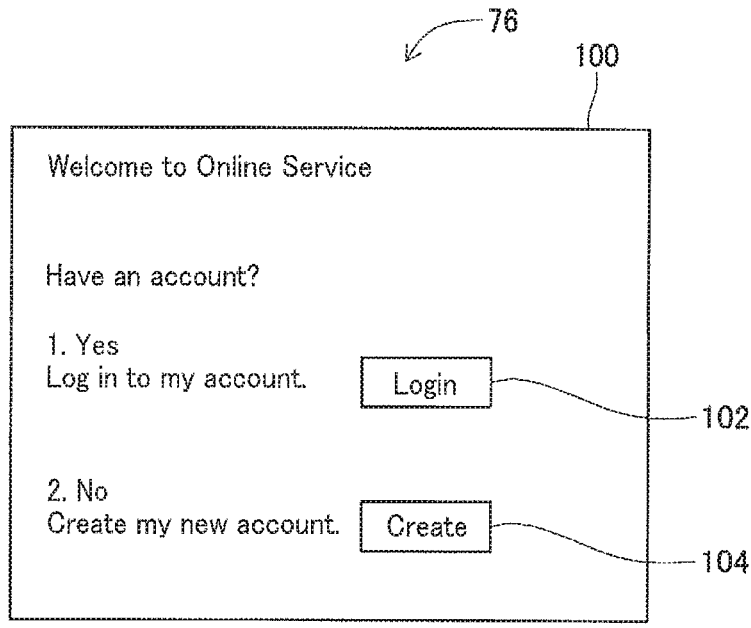
FIG. 7 is a view illustrating a top screen.

First, the user who desires to make a contract of the fixed-price print processing operates the PC 70 to access a web server of the maker that provides the service of the fixed-price print processing. In the communication system 1, the information management server 50 is the web server of the maker that provides the service of the fixed-price print processing. When the user operates the PC 70 to access the information management server 50, the PC 70 at M100 requests the information management server 50 to transmit top screen information (see FIG. 2). The information management server 50 at M102 transmits the top screen information to the PC 70 as a response to the request. Upon receiving the top screen information, the PC 70 at M104 displays a top screen 100 illustrated in FIG. 7 on the display 76 based on the top screen information.

Figure 8:
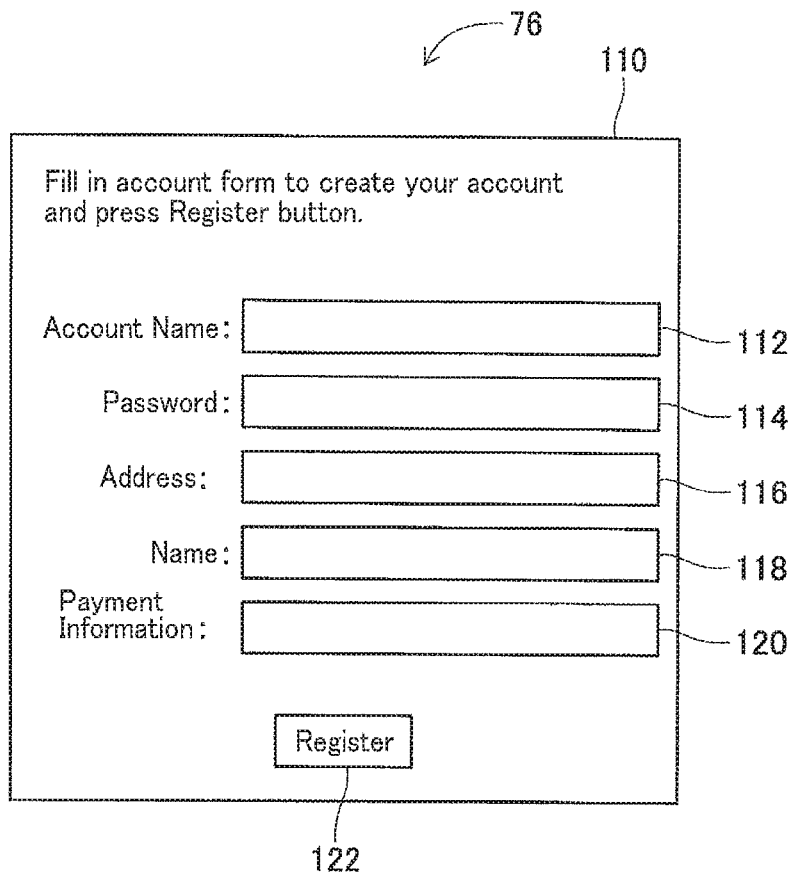
FIG. 8 is a view illustrating a registration screen.

The top screen 100 contains a Login button 102 and a Create button 104. The Login button 102 is operated by a user having an account for making a contract of the fixed-price print processing. The Create button 104 is operated for creating an account by a user not having an account for making a contract of the fixed-price print processing. When the user not having an account at M106 operates the Create button 104 on the top screen 100 (see "CREATE BUTTON OPERATED" in FIG. 2), the PC 70 at M108 requests the information management server 50 to transmit registration screen information. The information management server 50 at M110 transmits the registration screen information to the PC 70 as a response to the request. Upon receiving the registration screen information, the PC 70 at M112 displays a registration screen 110 illustrated in FIG. 8 on the display 76 based on the registration screen information.

The registration screen 110 contains five input fields 112-120 and a Register button 122. The five input fields 112-120 are respectively for inputting an account name, a password, an address, a name, and payment information. It is noted that the payment information relates to a credit card, for example. The user at M114 fills in the five input fields 112-120 and operates the Register button 122. In response, the PC 70 at M116 sends the information management server 50 the information input to the five input fields 112-120 (hereinafter may be referred to as "user information"). Upon receiving the user information, the information management server 50 at M117 stores the user information into the data storage area 62. As a result, the user information is registered into the information management server 50 as account data.

Figure 9:
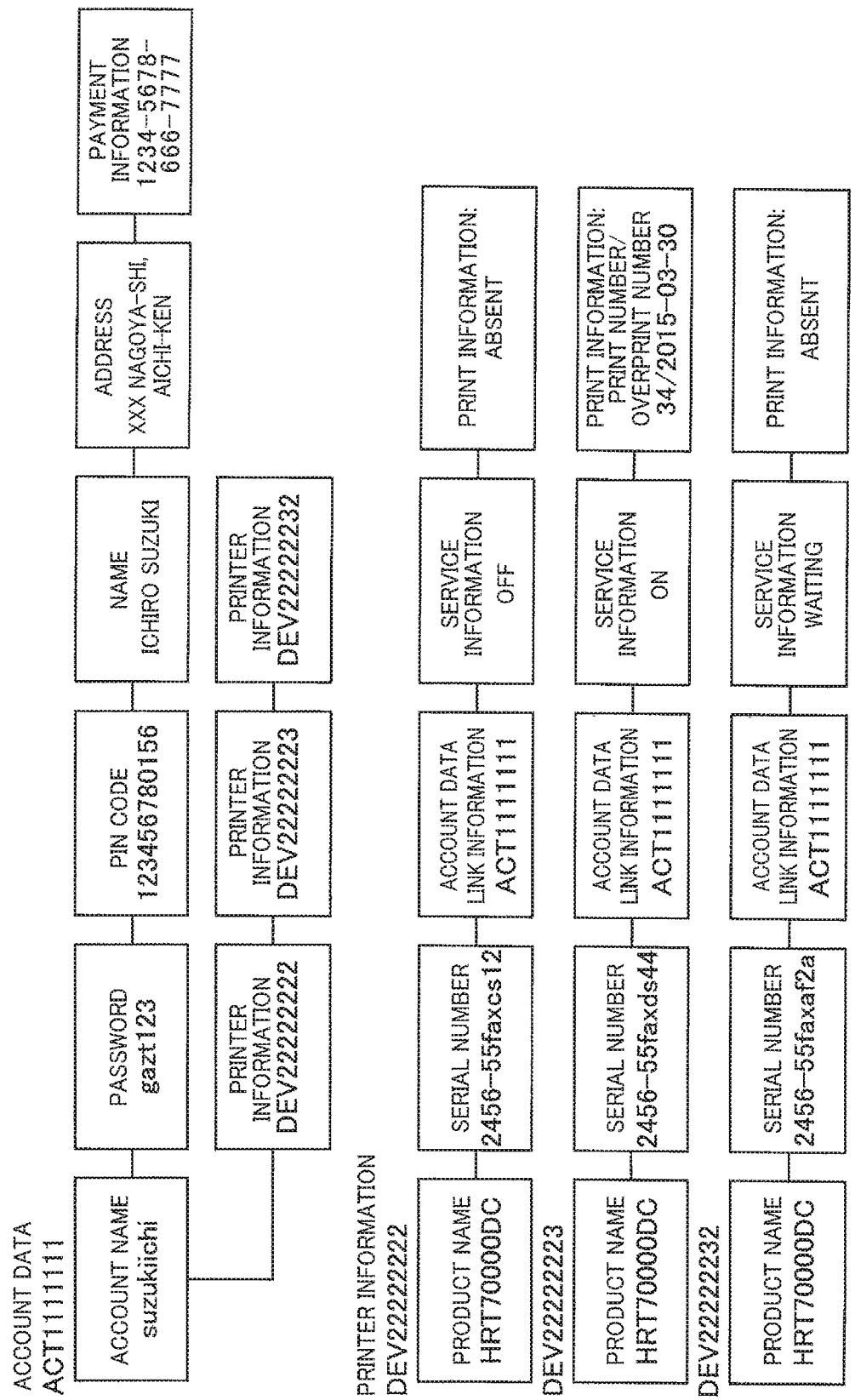
FIG. 9 is a view conceptually illustrating account data.

As illustrated in FIG. 9, the account data contains the user information (i.e., the account name, the password, the address, the name, and the payment information), information relating to a PIN code (hereinafter may be referred to as "code information"), and information relating to the printer (hereinafter may be referred to as "printer information"). When the user information is registered as the account data upon the user operation of the Create button 104 displayed on the top screen 100, only the user information is stored into the data storage area 62 as the account data, and neither the code information nor the printer information is stored.

When only the user information is stored into the data storage area 62 as the account data (M117), the information management server 50 at M129 (see FIG. 3) creates information for controlling the display 76 to display a screen based on the information registered as the account data (which screen may be referred to as "registration information screen"). The information management server 50 at M130 transmits the created registration-information-screen information to the PC 70. Upon receiving the registration-information-screen information, the PC 70 at M132 displays a registration information screen 130 illustrated in FIG. 10 on the display 76 based the registration-information-screen information.

Figure 11:
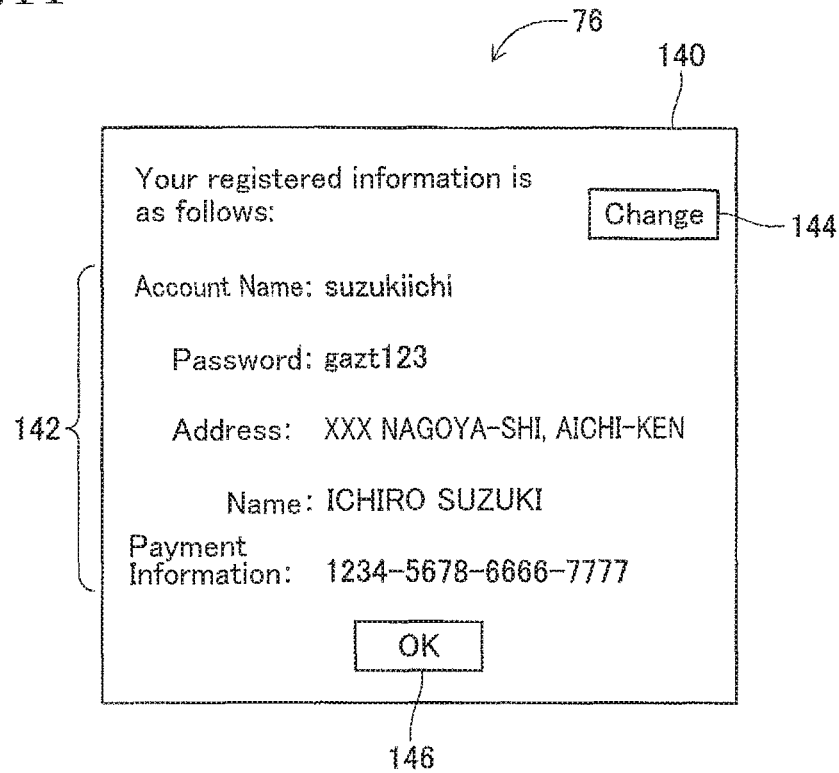
FIG. 11 is a view illustrating a user information screen.
Figure 12:
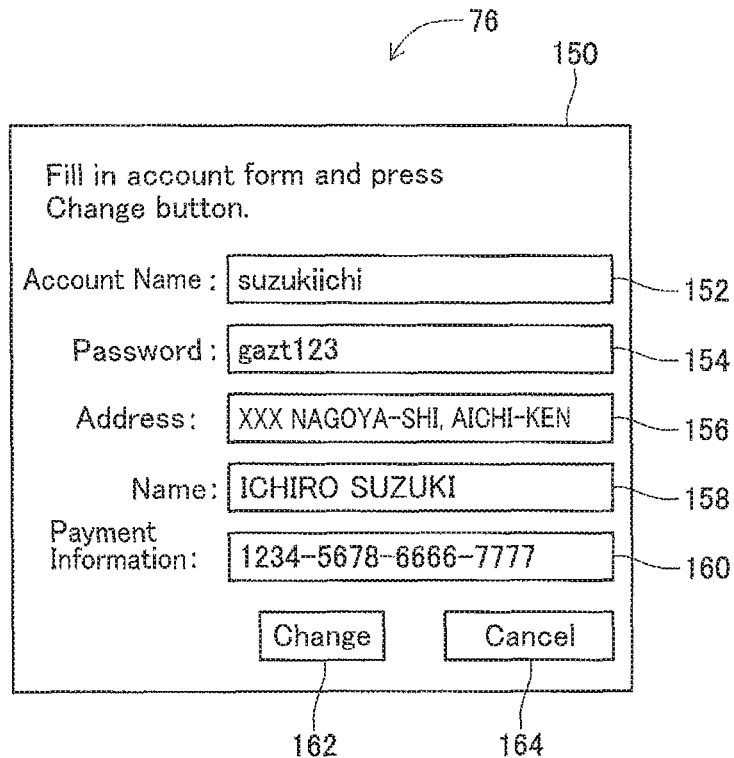
FIG. 12 is a view illustrating a user-information change screen.

The registration information screen 130 contains a user information button 132 and a code display button 134. The user information button 132 is for a check of the user information registered in the information management server 50. When the user information button 132 is operated, the PC 70 displays a user information screen 140 illustrated in FIG. 11 on the display 76. The user information screen 140 contains user information 142 registered in the information management server 50, a Change button 144, and an OK button 146. The Change button 144 is a button for a change of the user information. When the Change button 144 is operated, the PC 70 displays a user-information change screen 150 illustrated in FIG. 12 on the display 76.

The user-information change screen 150 contains five input fields 152-160, a Change button 162, and a Cancel button 164. The five input fields 152-160 are respectively for inputting the account name, the password, the address, the name, and the payment information. The user inputs user information to be changed, into one or more of the five input fields 152-160 and operates the Change button 162. In response, the PC 70 sends the information management server 50 the user information input to the five input fields 152-160. Upon receiving the user information, the information management server 50 changes the user information stored in the data storage area 62, to the received user information. When the Change button 162 displayed on the user-information change screen 150 is operated, the PC 70 displays the user information screen 140 on the display 76. When the OK button 146 displayed on the user information screen 140 is operated, the PC 70 displays the registration information screen 130 on the display 76. It is noted that in the case where the user desires only to check the user information without changing the user information on the user information screen 140, the user operates the OK button 146 to cause the display 76 to display the registration information screen 130.

When the code display button 134 displayed on the registration information screen 130 is operated (M134 in FIG. 3), the PC 70 at M136 requests the information management server 50 to issue a PIN code. Upon receiving the request of the PIN code, the information management server 50 at M137 issues the PIN code and registers information relating to the issued PIN code, i.e., the code information, into the data storage area 62 as the account data. As a result, as illustrated in FIG. 9, the user information (the account name, the password, the address, the name, and the payment information) and the code information are stored as the account data in association with each other. It is noted that the printer information has not been stored yet as the account data at this time.

Figure 13:
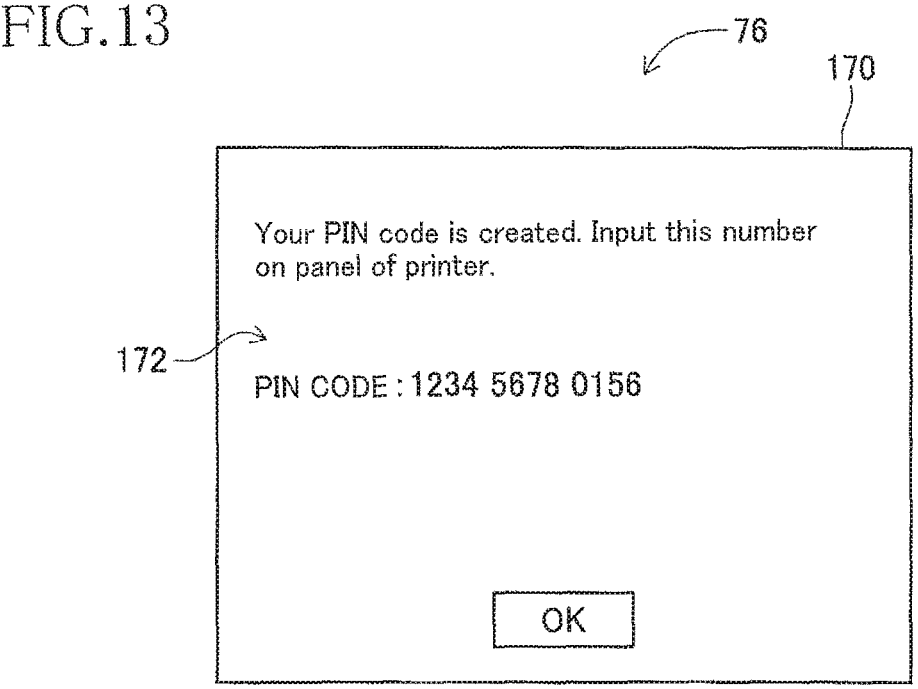
FIG. 13 is a view illustrating a code display screen.

Upon issuing the PIN code at M137, the information management server 50 at S 138 creates information relating to a screen for displaying the PIN code on the display 76 (which screen may be hereinafter referred to as "code display screen") and transmits the created code-display-screen information to the PC 70. Upon receiving the code-display-screen information, the PC 70 at M140 displays a code display screen 170 illustrated in FIG. 13 on the display 76 based on the code-display-screen information. The code display screen 170 contains code information 172. The user uses the PIN code corresponding to the code information 172 to register the printer information into the information management server 50.

Figure 14:
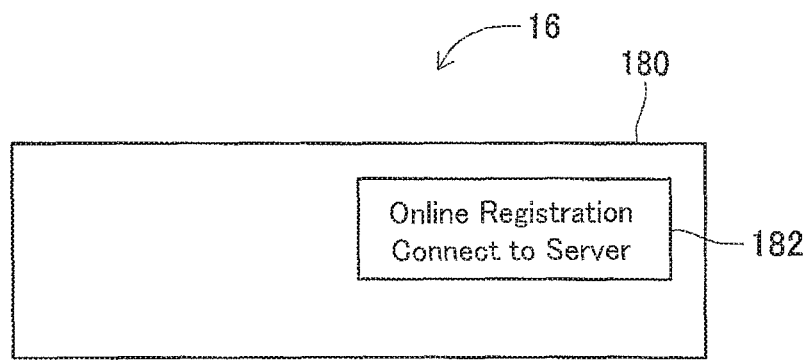
FIG. 14 is a view illustrating a connection screen.
Figure 15:
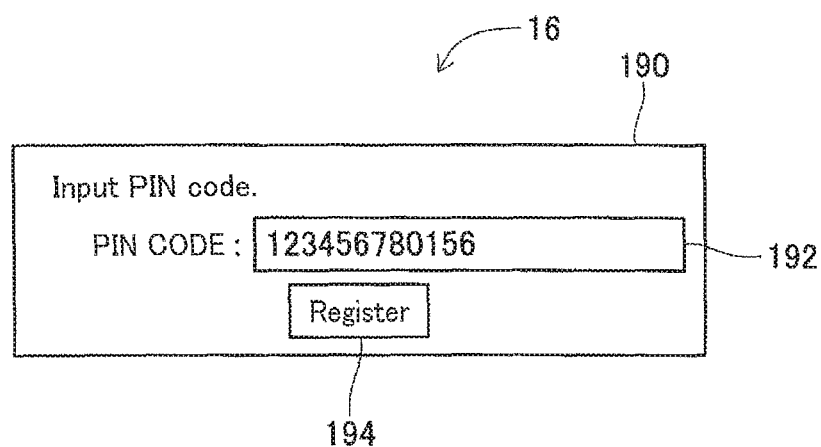
FIG. 15 is a view illustrating a code registration screen.

Specifically, a connection screen 180 illustrated in FIG. 14 is displayed on the display 16 of the printer 10. The connection screen 180 contains a connection button 182. When the connection button 182 is operated (at M142 (YES) in FIG. 3), the printer 10 at M144 requests the information management server 50 to transmit code-registration-screen information. Upon receiving the request, the information management server 50 at M146 transmits the code-registration-screen information. Upon receiving the code-registration-screen information, the printer 10 at M148 displays a code registration screen 190 illustrated in FIG. 15 on the display 16 based on the code-registration-screen information.

The code registration screen 190 contains an input field 192 and a Register button 194. The input field 192 is for an input of the PIN code. When the PIN code corresponding to the code information 172 displayed on the code display screen 170 at M140 is input to the input field 192, and the Register button 194 is operated, the printer 10 transmits information about the PIN code input to the input field 192, i.e., the code information, to the information management server 50. In this transmission, the printer 10 at M150 transmits not only the code information but also the serial number of the printer 10 (as one example of second identification information) and the product name of the printer 10 to the information management server 50.

Upon receiving the code information, the serial number, and the product name, the information management server 50 at M152 extracts the account data containing the PIN code corresponding to the code information, from the data storage area 62 and stores the serial number and the product name into the data storage area 62 as the printer information such that the serial number and the product name are associated with the account data. As a result, as illustrated in FIG. 9, the user information (the account name, the password, the address, the name, and the payment information), the code information, and the printer information are stored as the account data in association with each other.

In the account data illustrated in FIG. 9, three printer information are registered. Among the three printer information, the printer information "DEV22222222" relates to the printer 10. That is, the printer information "DEV22222222" is printer information that is registered using the serial number and the product name at M150. The printer information "DEV22222223" and the printer information "DEV22222232" are printer information having been already registered. That is, the user having registered the printer 10 have made a contract of the fixed-price print processing for two printers different from the printer 10.

In each printer information, the product name, the serial number, service information, and print information are associated with each other. The service information indicates a state of the service of the fixed-price print processing. Any of "WAITING", "ON", and "OFF" is set as the service information. "WAITING" indicates that the printer is in the waiting state. "ON" indicates that the printer is in the service ON state. "OFF" indicates that a contract of the fixed-price print processing is not made. As illustrated in FIG. 9, the printer 10 corresponding to the printer information "DEV22222222" has not made a contract of the fixed-price print processing. The printer corresponding to the printer information "DEV22222223" has already made a contract of the fixed-price print processing and is permitted to execute the fixed-price print processing. The printer corresponding to the printer information "DEV22222232" has already made a contract of the fixed-price print processing but has not executed the fixed-price print processing because the user has not received the specific cartridge or because the user has received the specific cartridge, but the specific cartridge is not connected to the connecting portion 24. It is noted that the print information relates to the print processing executed in the fixed-price print processing and will be explained later in detail.

Figure 16:
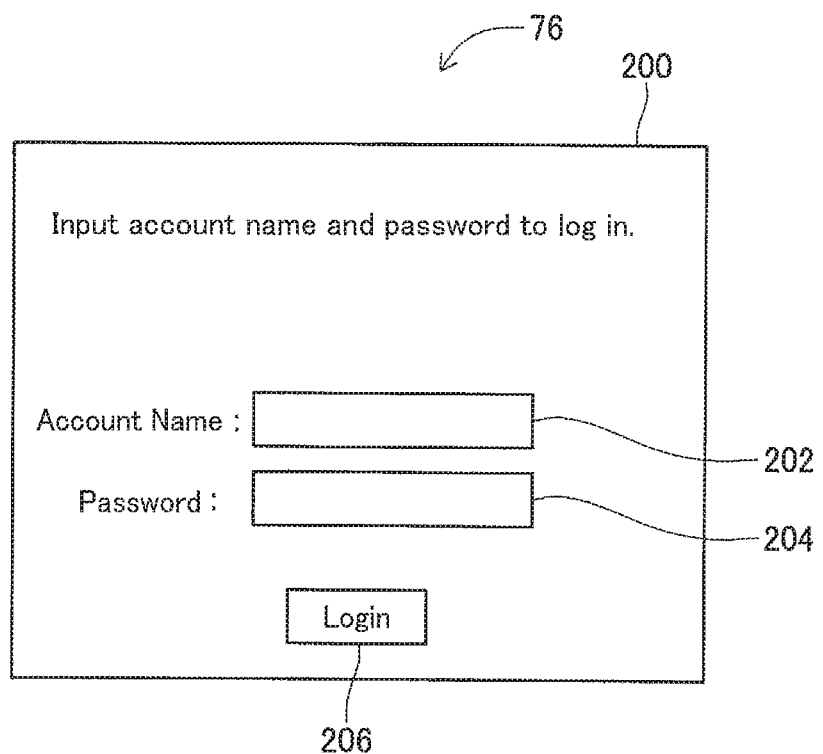
FIG. 16 is a view illustrating a login screen.

Thus, after the printer information is registered into the information management server 50, the user operates the PC 70 to log in to the information management server 50 again. That is, the user operates the PC 70 to access the information management server 50, so that the PC 70 displays the top screen 100 on the display 76 at M104 (see FIG. 2). Since the account of the user is registered in the information management server 50, the user operates the Login button 102 on the top screen 100 at M106 (LOGIN BUTTON OPERATED). In response to this operation, the PC 70 at M118 requests the information management server 50 to transmit login screen information. The information management server 50 at M120 transmits the login screen information to the PC 70 as a response to the request. Upon receiving the login screen information, the PC 70 at M122 displays a login screen 200 illustrated in FIG. 16 on the display 76 based on the login screen information.

The login screen 200 contains two input fields 202, 204 and a Login button 206. The two input fields 202, 204 are respectively for inputs of the registered account name and password. The user at M124 inputs the registered account name and password respectively to the two input fields 202, 204 and operates the Login button 206. In response, the PC 70 at M126 sends the information management server 50 the information input to the two input fields 202, 204 (which may be hereinafter referred to as "login information"). Upon receiving the login information, the information management server 50 at M128 extracts account data containing the login information.

Figure 3:
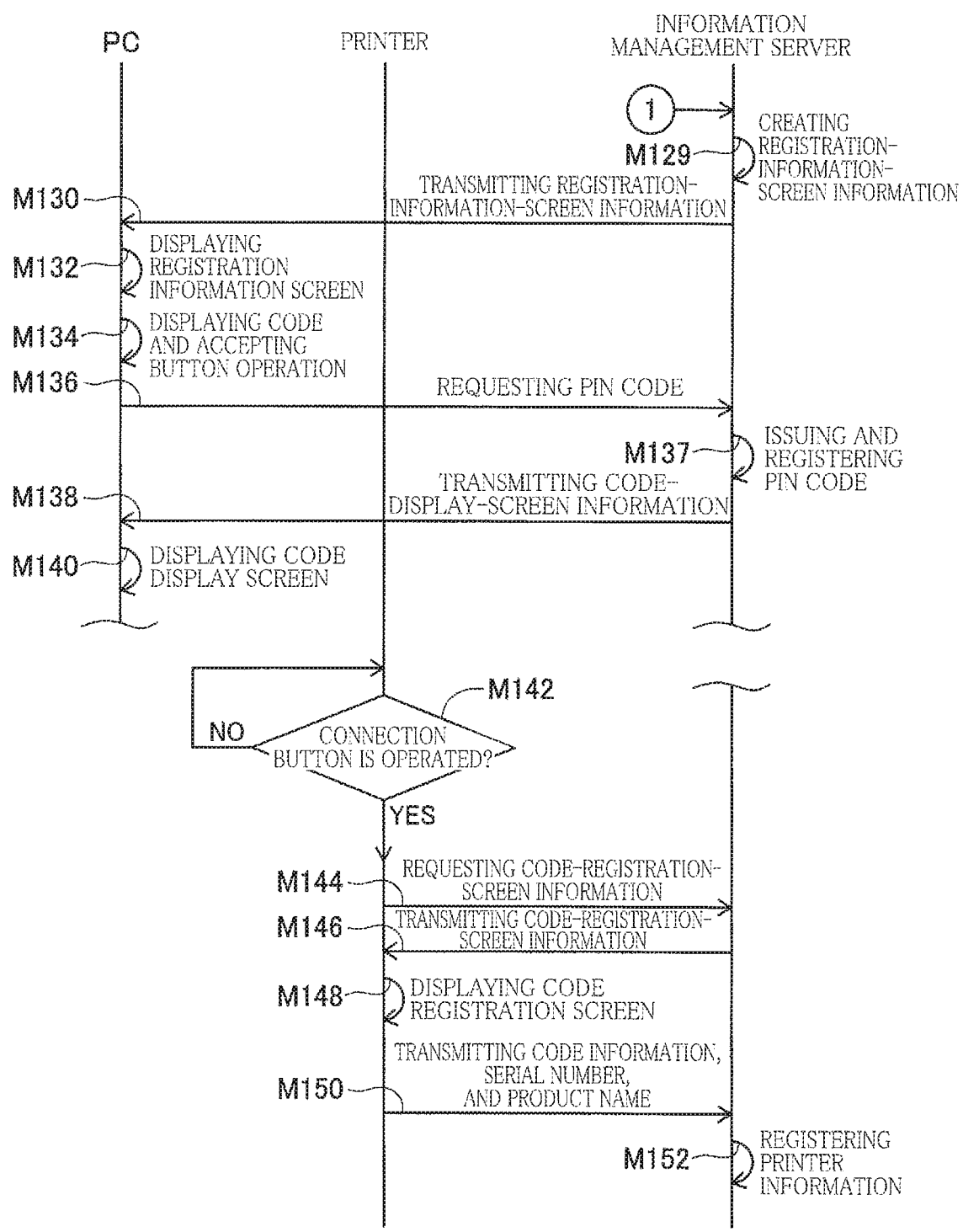
FIG. 3 is a sequence diagram illustrating operations in the communication system according to the first embodiment.
Figure 10:
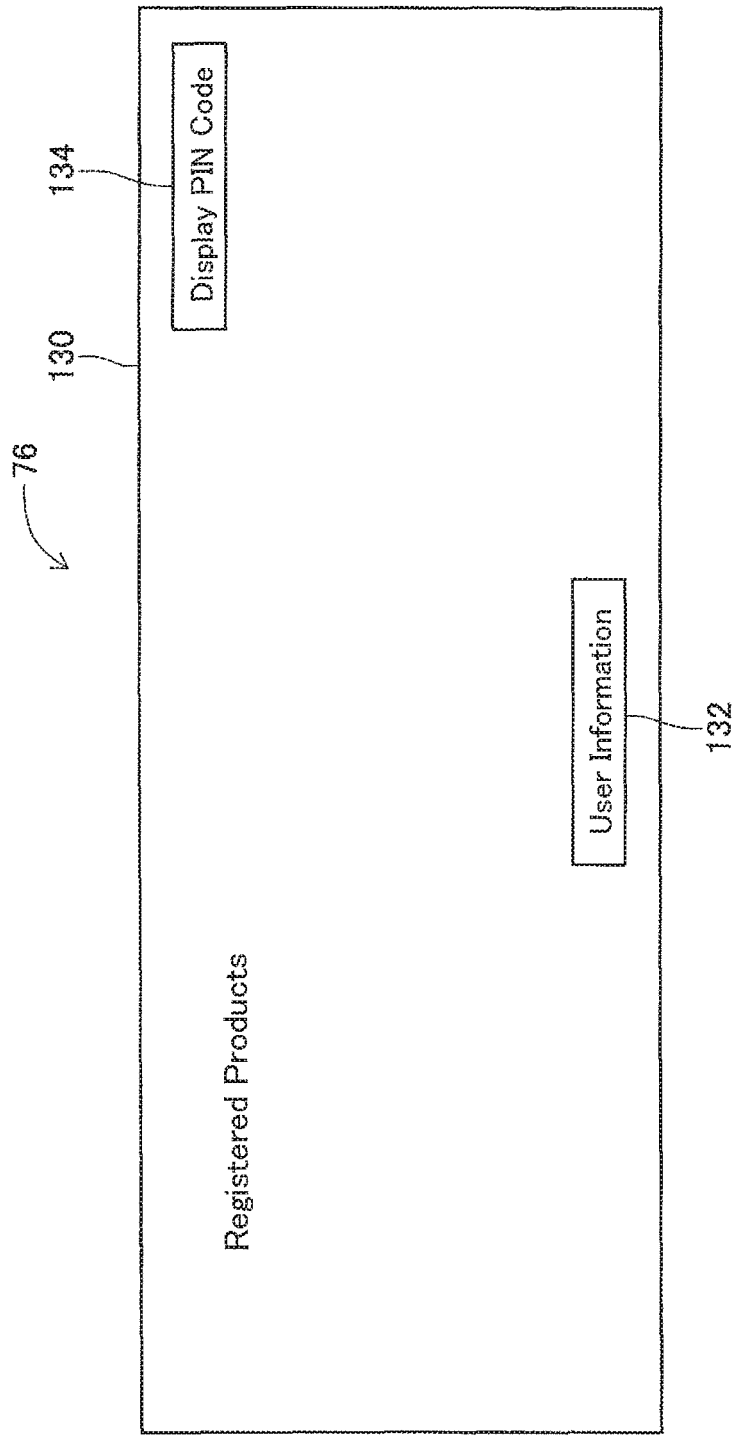
FIG. 10 is a view illustrating a registration information screen.

Upon extracting the account data, the information management server 50 at M129 in FIG. 3 creates registration-information-screen information based on the account data. The information management server 50 at M130 transmits the created registration-information-screen information to the PC 70. The PC 70 at M132 displays the registration information screen 130 on the display 76 based on the registration-information-screen information. However, when the registration information screen 130 illustrated in FIG. 10 is displayed on the display 76, only the user information is registered in the information management server 50 as the account data, and the code information and the printer information are not registered in the information management server 50. Thus, only the information relating to the user information is displayed on the registration information screen 130 illustrated in FIG. 10.

Figure 17:
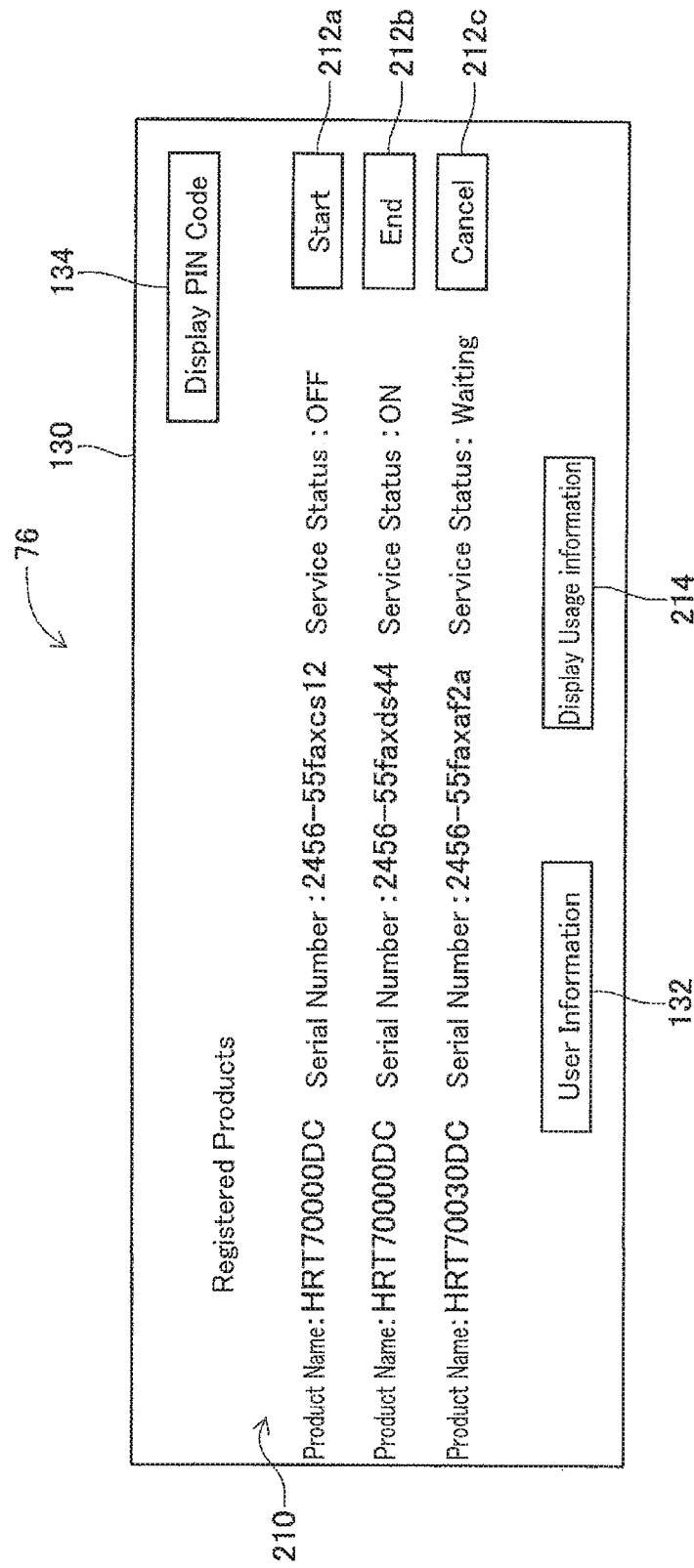
FIG. 17 is a view illustrating the registration information screen.

On the other hand, when the registration information screen 130 is displayed on the display 76 at this time, as illustrated in FIG. 9, the user information (the account name, the password, the address, the name, and the payment information), the code information, and the printer information are registered as the account data. Thus, information corresponding to the user information and the printer information of the account data are displayed on the registration information screen 130. Specifically, the registration information screen 130 illustrated in FIG. 17 is displayed on the display 76. Like the registration information screen 130 illustrated in FIG. 10, this registration information screen 130 contains the user information button 132 and the code display button 134. This registration information screen 130 further contains printer information 210, selection buttons 212 corresponding to the printer information 210, and a usage-information display button 214.

The account data illustrated in FIG. 9 contains the information about the three printers. Thus, the information about the three printers are displayed as the printer information 210 displayed on the registration information screen 130. The selection buttons 212 respectively correspond to the service information of the printer information 210. Specifically, a start selection button 212a is displayed for the printer information 210 whose service information indicates "OFF". The start selection button 212a is for making the contract of the fixed-price print processing. That is, in the printer 10 corresponding to the printer information 210 whose service information indicates "OFF", the contract of the fixed-price print processing has not been made. Thus, when the start selection button 212a is operated at M160 in FIG. 4, the PC 70 at M162 requests the information management server 50 to execute a processing for starting a contract of the fixed-price print processing. It is noted that the PC 70 transmits not only the request of contract of the fixed-price print processing but also the printer information corresponding to the start selection button 212a, to the information management server 50.

Upon receiving the request of contract of the fixed-price print processing, the information management server 50 at M164 transmits contract start information, which relates to the start of contract of the fixed-price print processing, to the printer 10 identified by the printer information received with the contract request. The contract start information contains: an instruction for changing the operation mode of the printer 10; an instruction for displaying a screen indicating the waiting state; and a contract period of the fixed-price print processing. Upon receiving the contract start information, the PC 70 at M166 transmits a response to the information management server 50. Upon receiving the response from the PC 70, the information management server 50 at M168 transmits delivery information and identification information for the cartridge to the delivery management server 90. The delivery information relates to the name and the address of the user information contained in the account data. The identification information for the cartridge to be transmitted relates to the specific cartridges to be connected to the printer for which the contract request is provided at M162 and identifies four cartridges respectively corresponding to the four colors of ink, namely, cyan, magenta, yellow, and black. That is, for the product name of each of at least one printer, the information management server 50 stores the identification information about the specific cartridges, for the cyan, magenta, yellow, and black ink, which are to be connected to the printer. With this configuration, the maker sends the specific cartridges, to the user identified by the delivery information, based on the delivery information transmitted to the delivery management server 90 and the identification information for the cartridge. The information management server 50 at M169 changes the service information of the account data relating to the printer information received with the request of contract of the fixed-price print processing, from "OFF" to "WAITING".

Figure 18:
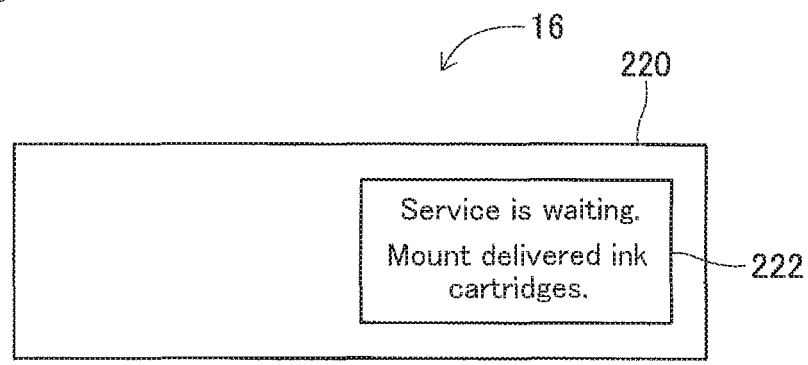
FIG. 18 is a view illustrating a waiting screen.

Upon receiving the contract start information from the information management server 50, the printer 10 at M170 switches the operation mode of the printer 10 from the first mode to the second mode. That is, before the start selection button 212a displayed on the registration information screen 130 is operated on the PC 70, a contract of the fixed-price print processing is not made in the printer 10. Thus, the printer 10 is in the first mode and executes the normal print processing. When the contract of the fixed-price print processing is made by operation on the start selection button 212a displayed on the registration information screen 130 on the PC 70, the operation mode of the printer 10 is switched to the second mode. The printer 10 at M172 displays a waiting screen 220 illustrated in FIG. 18 on the display 16. The waiting screen 220 contains a display field 222 that indicates that the printer 10 is in the waiting state and that prompts the user to connect the specific cartridges to the connecting portion 24 when the specific cartridges are received.

Figure 19:
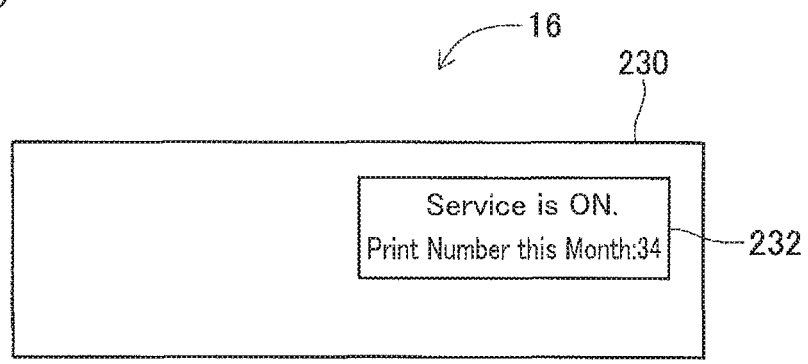
FIG. 19 is a view illustrating a fixed-price-print-processing available screen.

When the waiting screen 220 is displayed on the display 16, the printer 10 at M174 determines whether the specific cartridges are connected to the connecting portion 24. When the specific cartridges are connected to the connecting portion 24, as described above, the above-described particular period starts at the first connection of the specific cartridge to the connecting portion 24 (or at operation of the start selection button 212a or at determination at M174 that the specific cartridge is connected to the connecting portion 24, when the specific cartridge is connected to the connecting portion 24 before the start selection button 212a is operated at M160). Thus, when the specific cartridges are connected to the connecting portion 24, the printer 10 at S175 stores, into the data storage area 32, a date and time at which the specific cartridge is connected to the connecting portion 24 (or a time of operation of the start selection button 212a or a time of determination at M174 that the specific cartridge is connected to the connecting portion 24, when the specific cartridge is connected to the connecting portion 24 before the start selection button 212a is operated at M160). The printer 10 at M176 displays a fixed-price-print-processing available screen 230 illustrated in FIG. 19 on the display 16. The fixed-price-print-processing available screen 230 contains a display field 232 that indicates that the printer 10 is in the service ON state and that indicates the number of sheets printed in the fixed-price print processing. This display allows the user to recognize that the printer 10 can execute the fixed-price print processing.

The printer 10 at M178 determines whether the printer 10 can communicate with the information management server 50. When the printer 10 cannot communicate with the information management server 50, the printer 10 waits until the printer 10 is allowed to communicate with the information management server 50. When the printer 10 can communicate with the information management server 50, the printer 10 at M180 transmits start information to the information management server 50. It is noted that the printer 10 transmits not only the start information but also its serial number to the information management server 50. Upon receiving the start information, the information management server 50 at M182 changes the service information of the account data corresponding to the serial number received with the start information, from "WAITING" to "ON".

The above-described explanation relates to the case where the start selection button 212*a* is operated on the registration information screen 130 illustrated in FIG. 17, i.e., for the case where the contract of the fixed-price print processing is made. The registration information screen 130 further contains an end selection button 212*b* for the printer information 210 whose service information indicates "ON". The end selection button 212*b* is for a cancel of the contract of the fixed-price print processing. That is, in the printer corresponding to the printer information 210 whose service information is "ON", a contract of the fixed-price print processing has already been made, and accordingly the printer can execute the fixed-price print processing. Thus, when the end selection button 212*b* is operated, the PC 70 transmits a request for cancel of the contract of the fixed-price print processing, to the information management server 50. It is noted that the PC 70 transmits not only the request for cancel of the contract of the fixed-price print processing but also printer information corresponding to the end selection button 212*b* to the information management server 50. Upon receiving the request for cancel of the contract, the information management server 50 changes the service information of the account data relating to the printer information received with the request, from "ON" to "OFF".

The registration information screen 130 illustrated in FIG. 17 contains a cancel selection button 212*c* for the printer information 210 whose service information indicates "WAITING". The cancel selection button 212*c* is for canceling the contract of the fixed-price print processing. That is, the printer corresponding to the printer information 210 whose service information is "WAITING" is in the waiting state because a contract of the fixed-price print processing has already been made, but the user has not received the specific cartridge, or the user has received the specific cartridge, but the specific cartridge is not connected to the connecting portion 24. Thus, when the cancel selection button 212*c* is operated, the PC 70 transmits a request for cancel of the contract of the fixed-price print processing, to the information management server 50. It is noted that the PC 70 transmits not only the request for cancel of the contract of the fixed-price print processing but also printer information corresponding to the cancel selection button 212*c* to the information management server 50. Upon receiving the request for cancel of the contract, the information management server 50 changes the service information of the account data relating to the printer information received with the request, from "WAITING" to "OFF".

Figure 20:
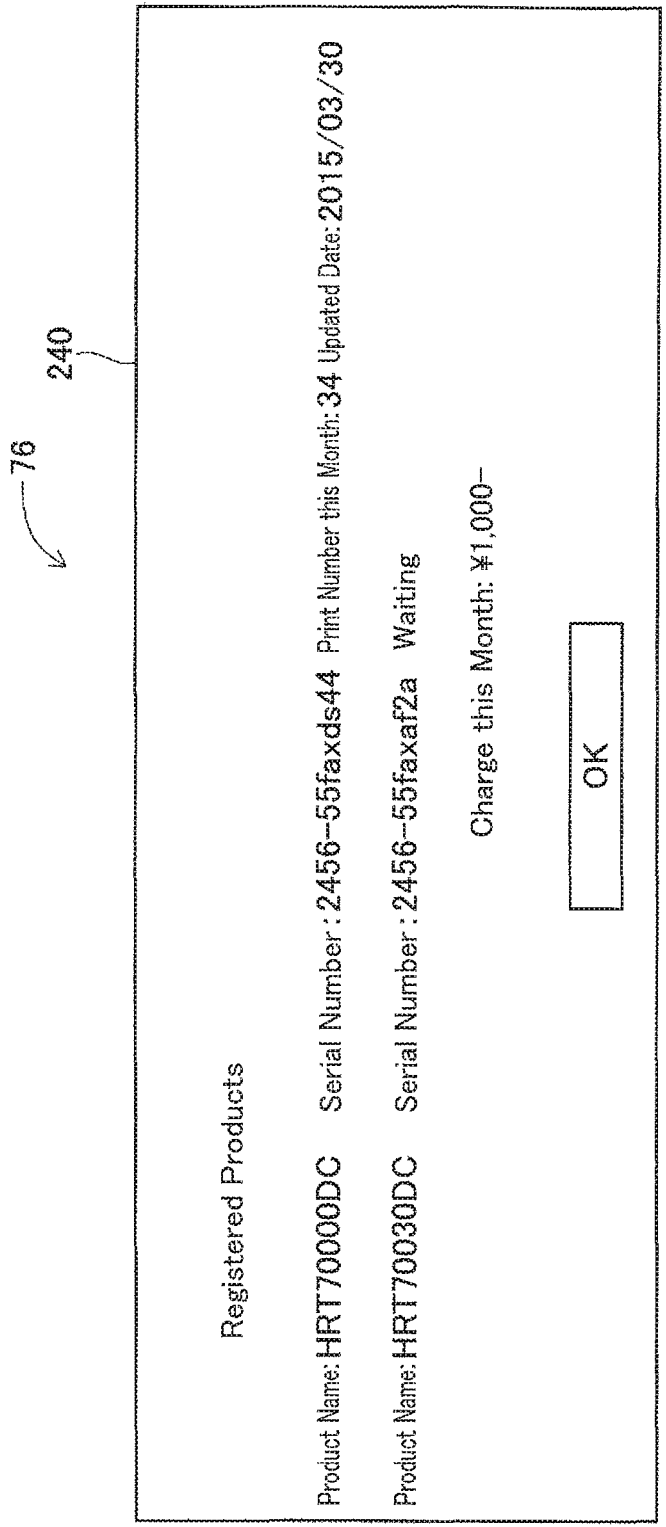
FIG. 20 is a view illustrating a usage-information display screen.

The usage-information display button 214 displayed on the registration information screen 130 illustrated in FIG. 17 is for displaying information about the printer being under the contract of the fixed-price print processing. Thus, when the usage-information display button 214 is operated, a usage-information display screen 240 illustrated in FIG. 20 is displayed on the display 76. The usage-information display screen 240 contains: the information about the printer being under the contract of the fixed-price print processing; and a charge for the fixed-price print processing. This screen allows the user to recognize a status of the contract of the fixed-price print processing, for example.

The above-described explanation relates to the cancel of the contract of the fixed-price print processing. There will be next explained the fixed-price print processing and the normal print processing. In the printer 10, the identification information for the cartridges 38 connected to the connecting portion 24 are read by the respective image readers 26 at M200 in FIG. 5. The detection sensor 27 at M202 detects the remaining amount of ink stored in each of the cartridges 38 connected to the connecting portion 24.

The CPU 12 of the printer 10 at M204 determines whether the operation mode of the printer 10 is the first mode or the second mode. When the operation mode of the printer 10 is the first mode (M204: FIRST MODE), the CPU 12 at M206 determines whether at least one specific cartridge 38 is connected to the connecting portion 24. The determination at M206 is executed based on the identification information for the cartridges 38 which are read at M200.

When at least one specific cartridge 38 is connected to the connecting portion 24 (M206: YES), the display 16 at M208 displays a rejection screen, not illustrated. The rejection screen contains a comment indicating that execution of the print processing using the specific cartridge is rejected because the contract of the fixed-price print processing is not made. The procedure then goes to M210. When no specific cartridge 38 is connected to the connecting portion 24 (M206: NO), the procedure goes to M210 by skipping M208. That is, when no specific cartridge 38 is connected to the connecting portion 24, the display 16 does not display the rejection screen.

The CPU 12 at M210 determines whether the print instruction is input. When no print instruction is input (M210: NO), this procedure returns to M200. When the print instruction is input (M210: YES), the CPU 12 at M212 determines whether at least one specific cartridge 38 is connected to the connecting portion 24. When no specific cartridge 38 is connected to the connecting portion 24 (M212: NO), the printer 10 at M214 executes the print processing. After the execution of the print processing, this procedure returns to M200. When at least one specific cartridge 38 is connected to the connecting portion 24 (M212: YES), the printer 10 at M216 rejects the print processing. That is, the print processing is not to be executed, and this procedure returns to M200.

When the CPU 12 at M204 determines that the operation mode of the printer 10 is the second mode (M204: SECOND MODE), the CPU 12 at M220 in FIG. 6 determines whether at least one specific cartridge 38 is connected to the connecting portion 24. When at least one specific cartridge 38 is connected to the connecting portion 24 (M220: YES), the display 16 at M222 displays the fixed-price-print-processing available screen 230 illustrated in FIG. 19. It is noted that the fixed-price print processing (as one example of a first recording processing) is the print processing that is one type of the print processings executed in the second mode and that is executed at M226, which will be described below, when the CPU 12 at M220 determines that at least one specific cartridge 38 is connected to the connecting portion 24 (M220: YES). It is noted that the types of the print processings executed in the second mode include the fixed-price print processing and the normal print processing (as one example of a second recording processing) that is executed at M242, which will be described below, when the CPU 12 at M220, which will be described below, determines that no specific cartridge 38 is connected to the connecting portion 24 (M220: NO).

The CPU 12 at M224 determines whether the print instruction is input. When the print instruction is input (M224: YES), the printer 10 at M226 executes the print processing. The CPU 12 at M228 stores the number of printed sheets into the data storage area 32. The CPU 12 then determines whether the printer 10 is communicable with the information management server 50. When the printer 10 cannot communicate with the information management server 50 (M230: NO), the processing at M230 is repeated until the printer 10 becomes communicable with the information management server 50.

When the printer 10 can communicate with the information management server 50 (M230: YES), the printer 10 at M232 transmits the identification information for the cartridge 38 which are read at M200 and the information relating to the remaining amount of ink which are detected at M202, to the information management server 50 as cartridge information. It is noted that the cartridge information are transmitted respectively for the cartridges 38 connected to the connecting portion 24. In addition to the cartridge information, the printer 10 at M232 sends the information management server 50 the print information about the number of printed sheets which is stored in the data storage area 32. It is noted that the printer 10 transmits the serial number thereof to the information management server 50 with the cartridge information and the print information.

Upon receiving the print information, the information management server 50 updates the print information of the account data corresponding to the serial number received with the print information, to the received print information. Specifically, as illustrated in FIG. 9, the print information of the account data contains: the number of sheets printed in the fixed-price print processing; and the date and time at which the print information is received from the printer 10. Thus, the printer 10 specifies the number of printed sheets based on the received print information and stores the specified number of printed sheets and the date and time at which the print information is received, as the print information of the account data. Upon receiving the cartridge information, the information management server 50 at M236 analyzes the cartridge information. Specifically, the CPU 12 determines whether or not the remaining amount of ink is less than or equal to the threshold value, based on the information relating to the remaining amount of ink which are contained in the cartridge information. When the remaining amount of ink is less than or equal to the threshold value, the printer 10 orders a new cartridge as a replacement for the cartridge having the remaining amount of ink less than or equal to the threshold value. In this order, the printer 10 designates the identification information for the cartridge. With this processing, a new specific cartridge is delivered to the user of the printer 10 before the cartridge becomes empty of the ink.

When the CPU 12 at M220 determines that no specific cartridge 38 is connected to the connecting portion 24 (M220: NO), the display 16 at M238 displays the waiting screen 220 illustrated in FIG. 18. The CPU 12 at M240 determines whether the print instruction is input. When the print instruction is input (M240: YES), the printer 10 at M242 executes the print processing, the procedure goes to M230. When no print instruction is input (M240: NO), this procedure goes to M230 by skipping M242.

In the printer 10, as described above, each time when the fixed-price print processing is executed, the CPU 12 stores the number of printed sheets into the data storage area 32. The printer 10 sends the information management server 50 the information about the number of printed sheets which is stored in the data storage area 32, at the timing when the printer 10 can communicate with the information management server 50. With this configuration, even in the case where the information management server 50 is not always communicable with the printer 10, the information management server 50 can obtain the number of sheets printed in the fixed-price print processing as needed. As a result, the information management server 50 can appropriately manage the number of sheets printed in the fixed-price print processing.

Second Embodiment

The control program 30 stored in the storage 14 of the printer 10 of the communication system 1 according to the first embodiment can control the operations of the printer 10 even when the printer is in any of the first mode and the second mode. That is, the printer 10 according to the first embodiment employs the control program 30 that enables the printer 10 to execute both of the print processing in the first mode and the print processing in the second mode. In contrast, the printer 10 according to a second embodiment employs the control program 30 that enables the printer 10 to execute the print processing in the first mode but disables the printer 10 to execute the print processing in the second mode. Thus, in the communication system 1 according to the second embodiment, when a contract of the fixed-price print processing is made, a control program configured to cause the printer 10 to execute the print processing in the second mode (noted that this control program may be hereinafter referred to as "second-mode execution program") is transmitted from the information management server 50 to the printer 10.

Figure 2:
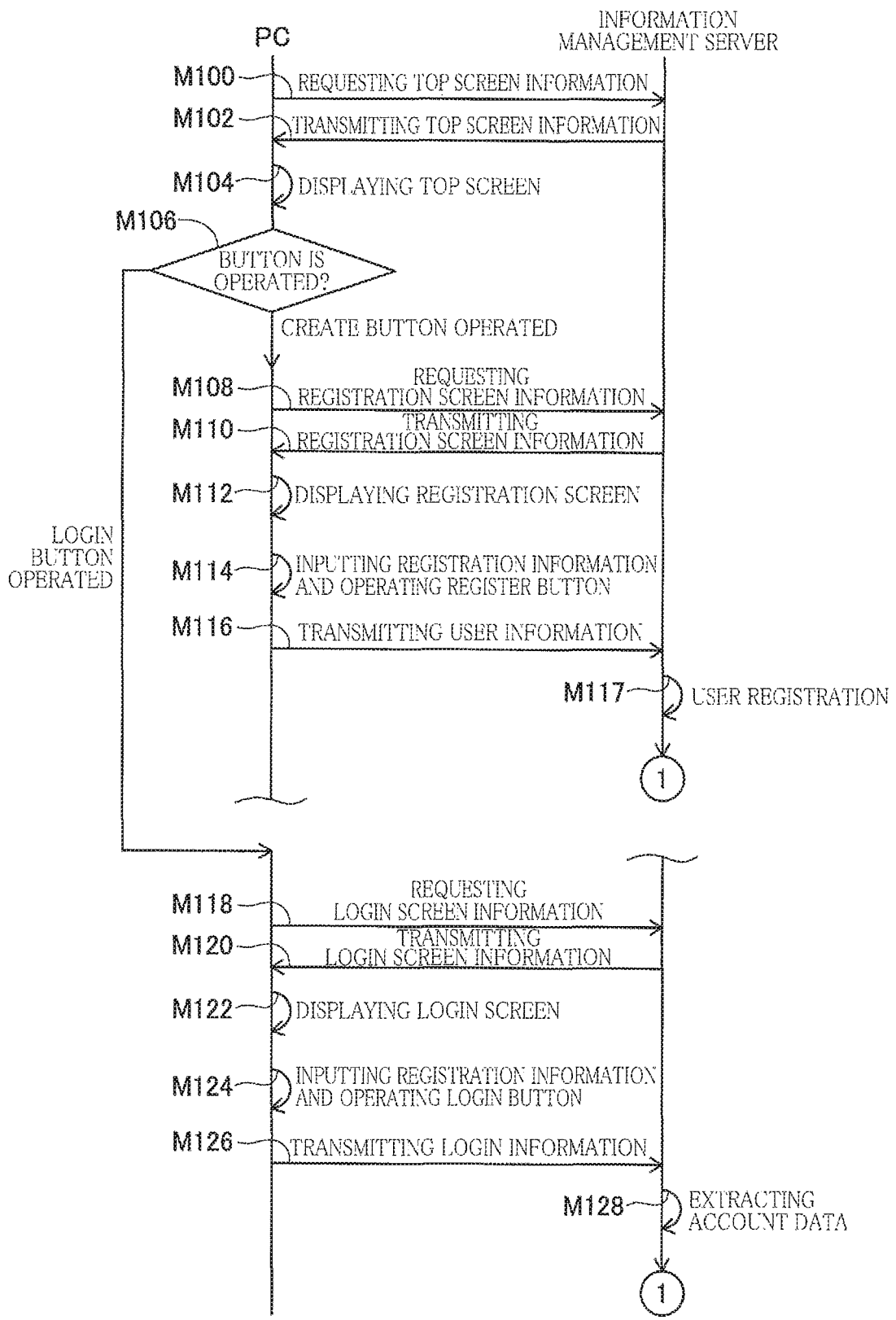
FIG. 2 is a sequence diagram illustrating operations in the communication system according to a first embodiment.
Figure 4:
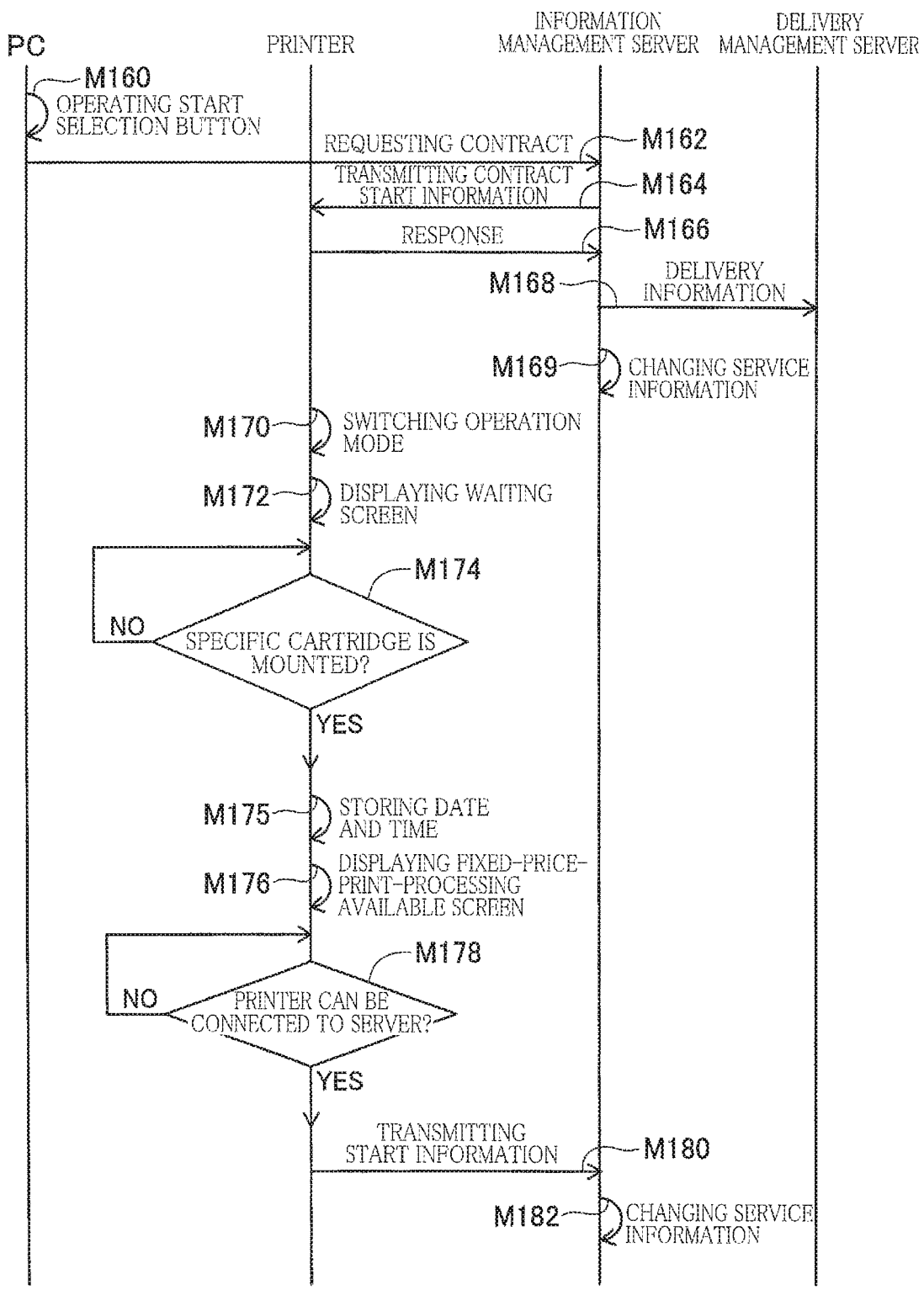
FIG. 4 is a sequence diagram illustrating operations in the communication system according to the first embodiment.
Figure 21:
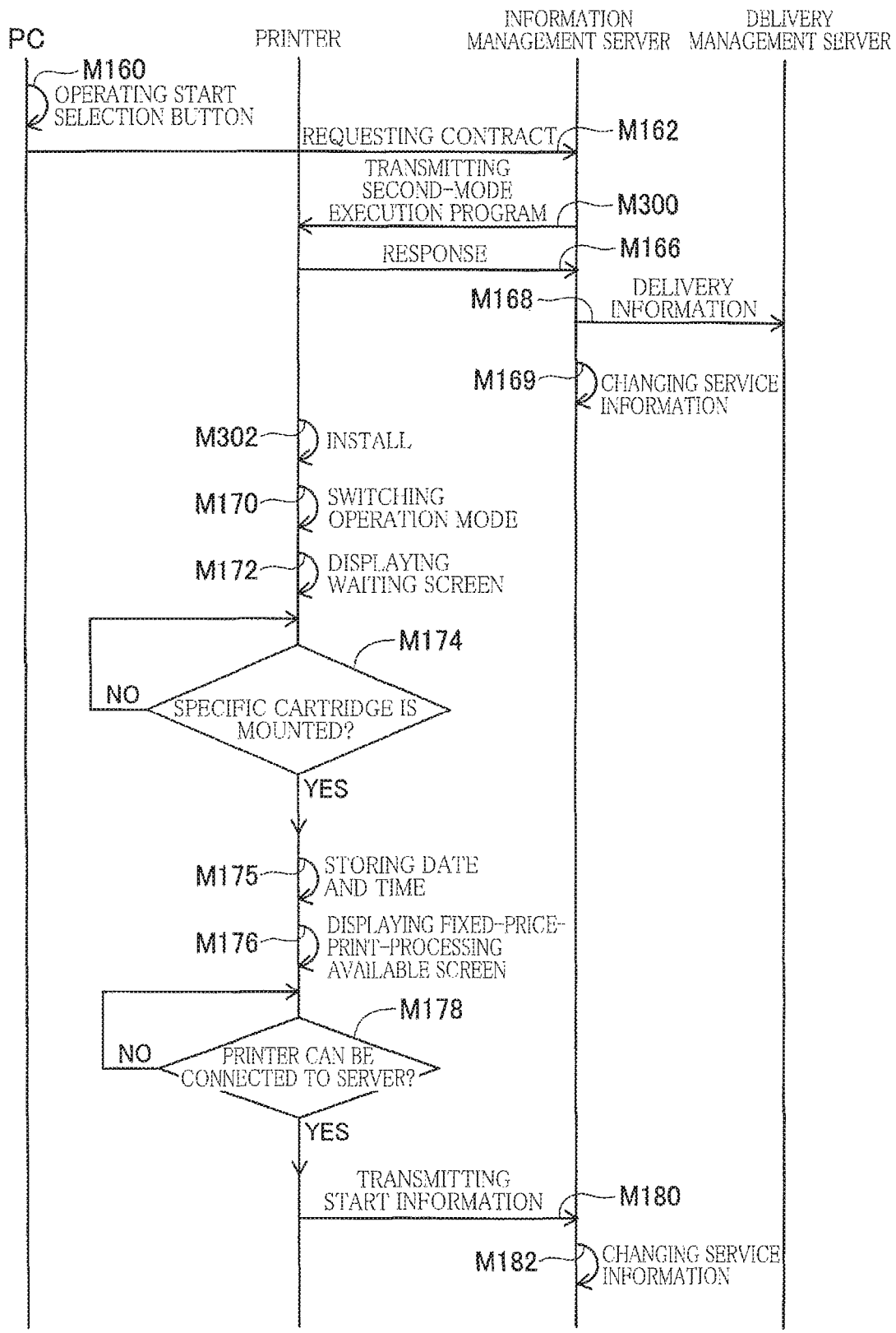
FIG. 21 is a sequence diagram illustrating operations in the communication system according to a second embodiment.

Specifically, in the communication system 1 according to the second embodiment, as in the communication system 1 according to the first embodiment, the account data constituted by the user information and the printer information is registered into the information management server 50 according to the procedure illustrated in FIGS. 2 and 3. When the user operates the start selection button 212a displayed on the registration information screen 130 illustrated in FIG. 17 (at M160 in FIG. 21), the PC 70 at M162 requests the information management server 50 to execute a processing for starting a contract of the fixed-price print processing. In this processing, the PC 70 transmits not only the request of contract of the fixed-price print processing but also the printer information corresponding to the start selection button 212a, to the information management server 50. Since the most part of the sequence diagram in FIG. 21 is similar to that of the sequence diagram in FIG. 4, the same numbers as used in FIG. 4 are used to designate the corresponding processings in FIG. 21.

Upon receiving the request of contract of the fixed-price print processing, the information management server 50 at M300 transmits the second-mode execution program to the printer 10 identified by the printer information received with the contract request. Upon receiving the second-mode execution program, the PC 70 at M166 transmits a response to the information management server 50. The information management server 50 then executes the processings at M168 and M169. These processings are similar to those at M168 and M169 in FIG. 4, and an explanation of which is dispensed with.

Upon receiving the second-mode execution program, the printer 10 installs the program at M302. This processing enables the printer 10 to execute the print processing in the second mode. That is, the printer 10 is enabled to execute the print processing in the second mode as explained with reference to FIG. 6. The processings at M170 and subsequent steps in FIG. 21 are similar to those at M170 and subsequent step in FIG. 4, and an explanation of which is dispensed with.

In the communication system 1 according to the second embodiment as described above, the second-mode execution program is transmitted from the information management server 50 to the printer 10 in response to the contract of the fixed-price print processing, enabling the printer 10 to execute the fixed-price print processing. With this configuration, the same effects as obtained in the communication system 1 according to the first embodiment can be obtained in the communication system 1 according to the second embodiment.

Third Embodiment

Figure 5:
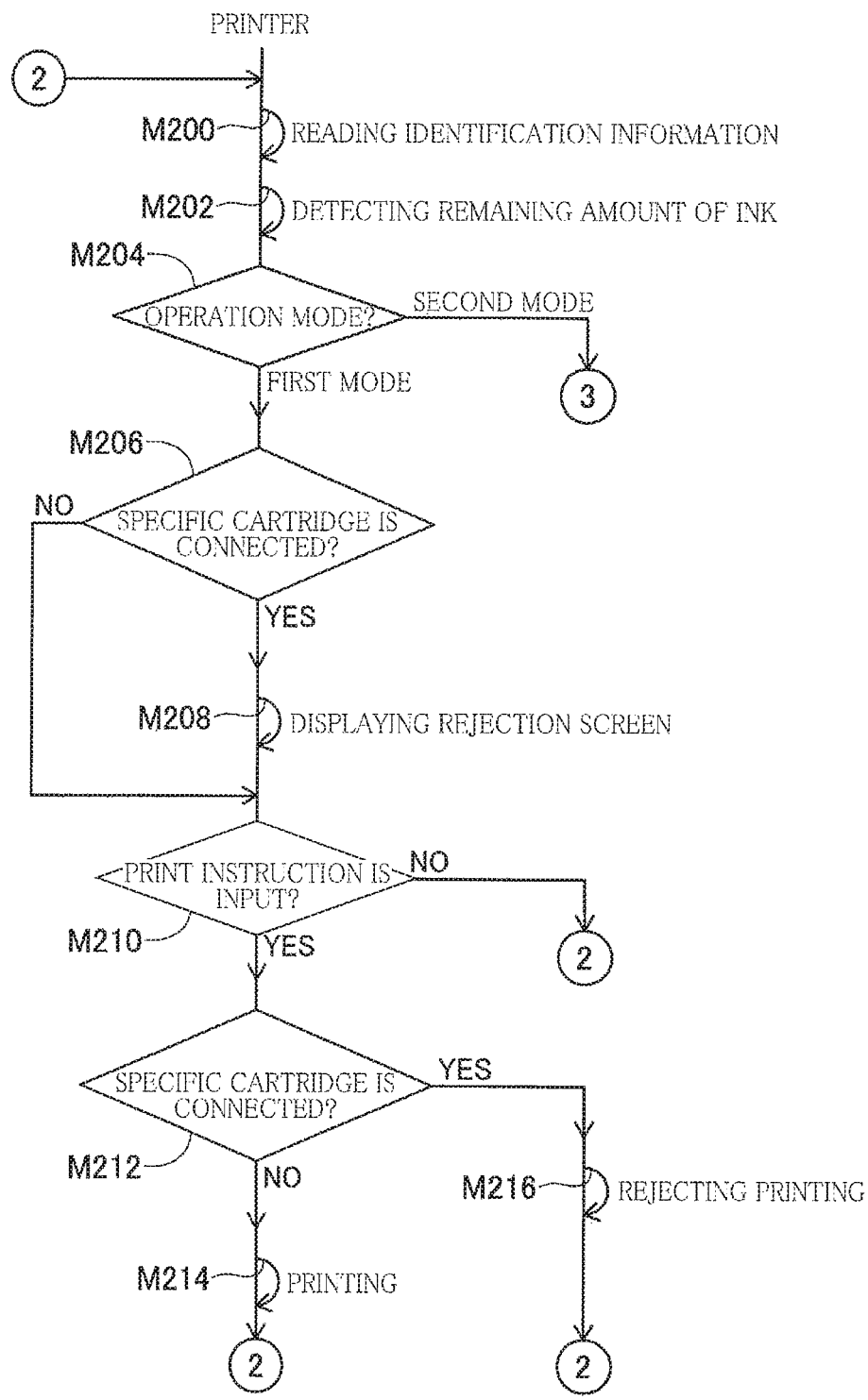
FIG. 5 is a sequence diagram illustrating operations in the communication system according to the first embodiment.
Figure 6:
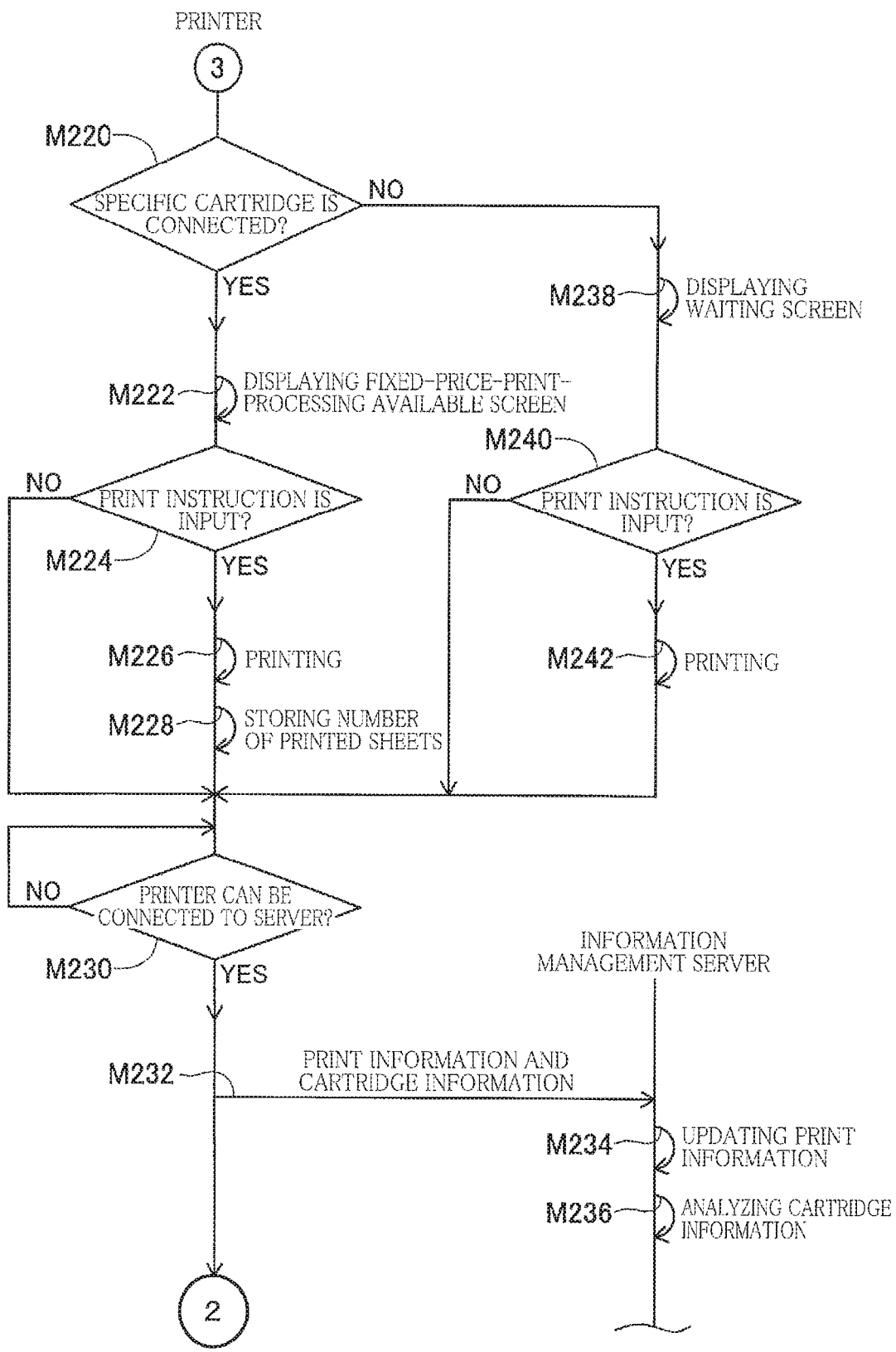
FIG. 6 is a sequence diagram illustrating operations in the communication system according to the first embodiment.
Figure 22:
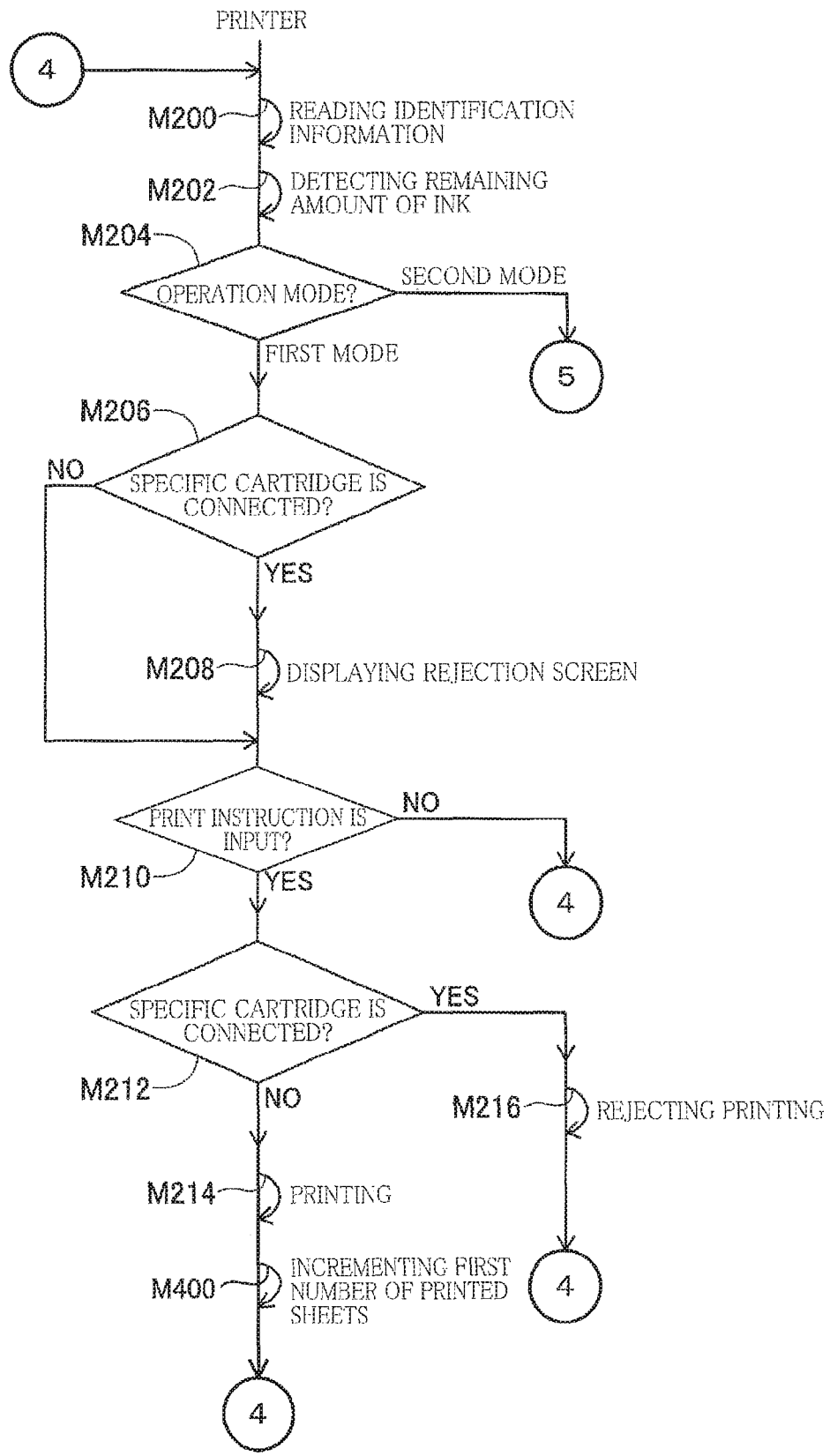
FIG. 22 is a sequence diagram illustrating operations in the communication system according to a third embodiment.
Figure 23:
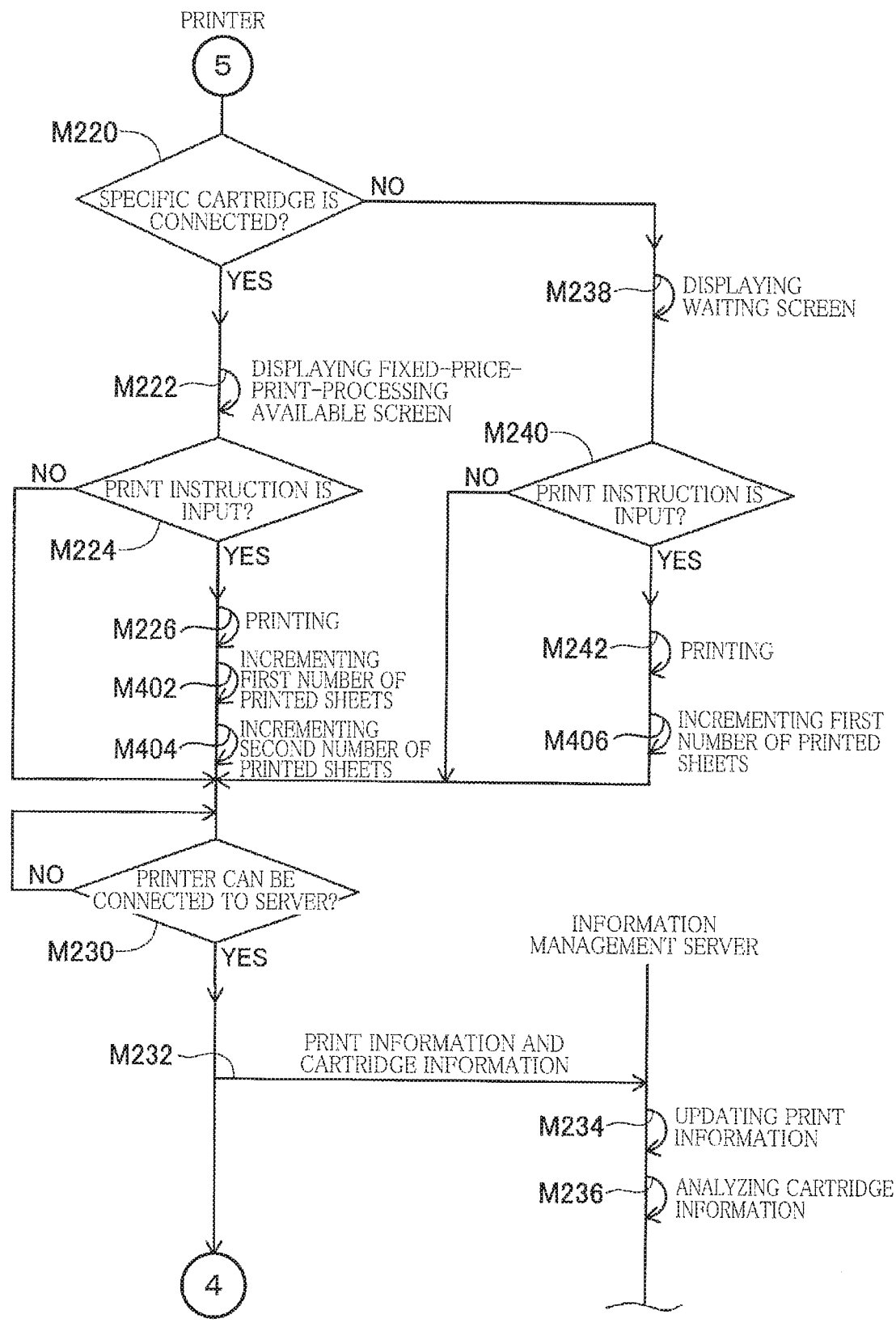
FIG. 23 is a sequence diagram illustrating operations in the communication system according to the third embodiment.

In the first and second embodiments, the printer 10 counts the number of printed sheets only when the fixed-price print processing is executed, that is, when the print processing is executed in the state in which one or more specific cartridges are connected in the second mode. In a third embodiment, in contrast, the printer 10 counts the number of printed sheets when the print processing is executed in the state in which one or more specific cartridges are connected in the second mode, and the printer 10 counts the number of printed sheets regardless of the operation mode and the connected cartridge. In the third embodiment, the cumulative number of printed sheets which does not relate to the operation mode or the connected cartridge is defined as a first number of printed sheets, and the cumulative number of printed sheets in the case where the print processing is executed in the state in which one or more specific cartridges are connected in the second mode is defined as a second number of printed sheets. It is noted that each of the first number of printed sheets and the second number of printed sheets may be reset or incremented in the printer 10 each time when the particular period is reached. There will be next explained the fixed-price print processing and the normal print processing in the third embodiment with reference to FIGS. 22 and 23. Since the most part of the sequence diagrams in FIGS. 22 and 23 is similar to that of the sequence diagrams in FIGS. 5 and 6, the same numbers as used in FIGS. 5 and 6 are used to designate the corresponding processings in FIGS. 22 and 23. At M400, the CPU 12 increments the first number of printed sheets stored in the data storage area 32 by the number of sheets printed at M214, and this procedure returns to M200. The CPU 12 at M402 increments the first number of printed sheets by the number of sheets printed at M226 and at M404 increments the second number of printed sheets by the number of sheets printed at M226, and the procedure goes to M230. At M406, the CPU 12 increments the first number of printed sheets by the number of sheets printed at M242.

In the third embodiment as described above, the printer 10 counts the number of printed sheets when the print processing is executed in the state in which one or more specific cartridges are connected in the second mode, and the printer 10 counts the number of printed sheets regardless of the operation mode and the connected cartridge. Thus, the printer 10 can manage the number of printed sheets in detail. The printer 10 may be configured to count, as the first number of printed sheets, the number of printed sheets in the print processing executed when all the cartridges connected to the connecting portion 24 are the normal cartridges. In this configuration, the processing M402 in FIG. 23 is not necessary.

While the embodiments have been described above, it is to be understood that the disclosure is not limited to the details of the illustrated embodiments, but may be embodied with various changes and modifications, which may occur to those skilled in the art, without departing from the spirit and scope of the disclosure. Specifically, the fixed-price print processing may use a value calculated by assigning weights to the amount of ink usage in the print processing. For example, even in the case where the print processing is executed for a single sheet, the printer 10 may increment the number of printed sheets by one when an amount of ink usage is greater than or equal to a threshold value and increment the number of printed sheets by 0.5 when the amount of ink usage is less than the threshold value.

The information management server 50 is one web server in the above-described embodiments but may be constituted by a plurality of web servers. Also, the information about the login is transmitted from the PC 70 to the information management server 50 in the above-described embodiments. That is, the PC 70 at M100 requests the information management server 50 to transmit the top screen information, and the information management server 50 transmits the information about the top screen in FIG. 7 to the PC 70 as the response to the request. The user at M118 operates the Login button contained in the top screen 100 displayed on the display 76 of the PC 70 to request the information management server 50 to transmit the login screen information. The information management server 50 at M120 transmits the login screen information about the login screen 200 in FIG. 16 to the PC 70 as the response to the request. Upon receiving the login screen information, the PC 70 at M122 displays the login screen 200 on the display 76 based on the login screen information. In a modification, the login information may be transmitted from the printer 10 to the information management server 50. That is, in this modification, the user operates the printer 10 to request the information management server 50 to transmit the top screen information. The information management server 50 transmits the information about the top screen 100 to the printer 10 as a response to the request. The user operates the Login button on the top screen 100 displayed on the display 16 of the printer 10 to request the information management server 50 to transmit the login screen information. The information management server 50 transmits the login screen information about the login screen 200 to the printer 10 as a response to the request. The printer 10 displays the login screen 200 on the display 16 based on the login screen information. The user inputs the login information to the login screen 200 displayed on the display 16 of the printer 10 and transmits the input login information to the information management server 50.

In the above-described embodiments, the information management server 50 and the printer 10 transfer data, such as the instruction for switching the mode and the cartridge information, directly to each other but may transfer the data to each other via the PC 70, for example. That is, the printer 10 may be connected to the PC 70 by, e.g., a USB cable, a LAN, or a wireless LAN, and the printer 10 and the information management server 50 may transfer the data to each other via the PC.

The procedure of the contract of the fixed-price print processing is not limited to that described above. For example, without the printer 10 directly communicating with the information management server 50, the PC connected to the printer 10 can acquire the information, such as the serial number and the product name, from the printer 10 and transmit the information management server 50 to register the printer 10 into the information management server 50.

Different types of the fixed-price print processings may be provided by different makers. In this case, when the printer 10 stores the control program 30 capable of controlling the printer 10 to execute the fixed-price print processing provided by a certain maker, the printer 10 is preferably controlled by the control program 30 not to execute the print processing using the specific cartridge for a fixed-price print processing provided by another maker in each of the first mode and the second mode. That is, the specific cartridge for the fixed-price print processing provided by another maker is an illicit cartridge. It is noted that the technique for rejecting use of the illicit cartridge is well known, and an explanation of which is dispensed with.

The information management server 50 and the delivery management server 90 transfer the data via the network such as the network interface 56 in the above-described embodiments but may transfer the data using a USB cable, for example.

In the above-described embodiments, the printer 10 transmits the information relating to the remaining amount of ink to the information management server 50, and the information management server 50 determines whether the order of the cartridge is required, based on the information relating to the remaining amount of ink. However, when the remaining amount of ink becomes small, the printer 10 may transmit a request for an order of the ink to an external device.

The ink-jet image recorder 22 is used in the above-described embodiments, but an electronic photographic image recorder may be used. In this case, the cartridge stores toner instead of ink.

While the processings illustrated in FIGS. 2-6 are executed by the CPU 12, the CPU 52, and the CPU 72 in the above-described embodiments, other devices may execute these processing. For example, these processing may be executed by an ASIC or other logical integrated circuits and may be executed by cooperation of the CPU, the ASIC, and other the logical integrated circuits, for example.

What is claimed is:

1. An image recording apparatus, comprising:
   an image recorder configured to cause a recording material to adhere to a recording sheet to record an image;
   a connecting portion to which at least one cartridge filled with the recording material is to be removably connected, the at least one cartridge each being provided with a storage medium storing identification information relating to each of the at least one cartridge;
   a reader configured to read the identification information stored in the storage medium provided on each of the at least one cartridge connected to the connecting portion;
   a storage; and
   a first controller configured to perform:
      controlling the image recorder to execute a recording processing selectively in one of a first mode and a second mode different from the first mode;
      determining whether a specific-type cartridge has been connected to the connecting portion, based on the identification information relating to each of the at least one cartridge which is read by the reader;
      in the first mode, controlling the image recorder to execute the recording processing when the first controller determines that the specific-type cartridge has not been connected to the connecting portion and controlling the image recorder not to execute the recording processing when the first controller determines that the specific-type cartridge has been connected to the connecting portion;
      in the second mode, controlling the image recorder to execute the recording processing in any of a case where the first controller determines that the specific-type cartridge has not been connected to the connecting portion and a case where the first controller determines that the specific-type cartridge has been connected to the connecting portion; and
      storing, into the storage, first recording information relating to the recording processing executed when the first controller determines that the specific-type cartridge has been connected to the connecting portion.

2. The image recording apparatus according to claim 1, wherein the first controller is configured to control the image recorder to execute a first recording processing in the second mode when the first controller determines that the specific-type cartridge has not been connected to the connecting portion,
   wherein the first recording processing is the recording processing to be executed in a state in which the specific-type cartridge is not connected to the connecting portion,
   wherein the first controller is configured to control the image recorder to execute a second recording processing in the second mode when the first controller determines that the specific-type cartridge has been connected to the connecting portion,
   wherein the second recording processing is the recording processing to be executed in a state in which the specific-type cartridge is connected to the connecting portion, and
   wherein the first controller is configured to store, into the storage, the first recording information indicating the number of recording sheets recorded in the second recording processing executed in the state in which the specific-type cartridge is connected to the connecting portion.

3. The image recording apparatus according to claim 1, further comprising a first communication device configured to communicate with an external device,
   wherein the first controller is configured to control the first communication device to transmit the first recording information stored in the storage, to the external device.

4. The image recording apparatus according to claim 1, further comprising a first communication device configured to communicate with an external device,
   wherein the first controller is configured to switch a mode of the recording processing from the first mode to the second mode when the first communication device receives a mode switch instruction from a server as the external device.

5. The image recording apparatus according to claim 4, wherein the first controller is configured to control the first communication device to transmit the first recording information stored in the storage, to the server.

6. The image recording apparatus according to claim 1, wherein the connecting portion is connectable to a plurality of cartridges as the at least one cartridge, and wherein the first controller is configured to:
 determine that the specific-type cartridge has been connected to the connecting portion, when at least one of the plurality of cartridges connected to the connecting portion is the specific-type cartridge; and
 determine that the specific-type cartridge has not been connected to the connecting portion, when any of the plurality of cartridges connected to the connecting portion is not the specific-type cartridge.

7. The image recording apparatus according to claim 1, further comprising a display,
 wherein the first controller is configured to display first display information based on the first recording information on the display in the second mode when the first controller determines that the specific-type cartridge has been connected to the connecting portion.

8. The image recording apparatus according to claim 1, further comprising a first communication device configured to communicate with an external device,
 wherein the first controller is configured to control the first communication device to transmit remaining amount information to the external device, and the remaining amount information relates to a remaining amount of the recording material stored in the specific-type cartridge connected to the connecting portion.

9. The image recording apparatus according to claim 1, wherein in a case where a contract is made by a user, when the number of recording sheets recorded in the recording processing using the specific-type cartridge is less than a particular number, the specific-type cartridge is unlimitedly supplied within a particular period at a particular price corresponding to the particular number.

10. The image recording apparatus according to claim 1,
 wherein the connecting portion is connectable to a plurality of cartridges as the at least one cartridge, and
 wherein the first controller is configured to control the image recorder to execute the recording processing in any of the first mode and the second mode when any of the plurality of cartridges connected to the connecting portion is not the specific-type cartridge.

11. The image recording apparatus according to claim 1, wherein the first controller is configured to store the first recording information into the storage in a state in which the first recording information is distinguished from second recording information relating to the recording processing executed when the first controller determines that the specific-type cartridge has not been connected to the connecting portion.

12. The image recording apparatus according to claim 1, wherein the first recording information contains the number of recording sheets, for each of which the image is recorded in the recording processing executed when the specific-type cartridge has been connected to the connecting portion.

13. A server, comprising:
 a second communication device configured to communicate with an information processor and an image recording apparatus that comprises a connecting portion and that executes a recording processing for recording an image on a recording sheet with a recording material stored in a cartridge connected to the connecting portion; and
 a second controller,
 the image recording apparatus being configured to perform:
  executing the recording processing selectively in one of a first mode and a second mode different from the first mode;
  in the first mode, executing the recording processing when a specific-type cartridge has not been connected to the connecting portion and not executing the recording processing when the specific-type cartridge has been connected to the connecting portion; and
  in the second mode, executing the recording processing in any of a case where the specific-type cartridge has not been connected to the connecting portion and a case where the specific-type cartridge has been connected to the connecting portion,
 the second controller being configured to perform:
  controlling the second communication device to receive user information for identifying a user, from one of the information processor and the image recording apparatus;
  controlling the second communication device to receive identification information for identifying the image recording apparatus, from one of the information processor and the image recording apparatus;
  in response to receiving the user information and the identification information, controlling the second communication device to transmit a switch instruction to the image recording apparatus, the switch instruction instructing a switch of a mode of the image recording apparatus identified by the identification information, from the first mode to the second mode; and
  outputting an instruction for sending the specific-type cartridge to the user identified by the received user information, when the second controller receives a response to the transmitted switch instruction, from the image recording apparatus via the second communication device.

14. A server, comprising:
 a second communication device configured to communicate with an information processor and an image recording apparatus that comprises a connecting portion and that executes a recording processing for recording an image on a recording sheet with a recording material stored in a cartridge connected to the connecting portion; and
 a second controller configured to perform:
  controlling the second communication device to receive user information for identifying a user, from one of the information processor and the image recording apparatus;
  controlling the second communication device to receive identification information for identifying the image recording apparatus, from one of the information processor and the image recording apparatus;
  controlling the second communication device to transmit a program in response to receiving the user information and the identification information, the program causing an image recorder of the image recording apparatus identified by the identification information, to execute the recording processing regardless of whether a specific-type cartridge has been connected to the connecting portion of the image recording apparatus, the program causing the image recording apparatus to store recording information into a storage of the image recording apparatus, the recording information relating to the recording processing executed when the specific-type cartridge has been connected to the connecting portion of the image recording apparatus; and outputting an instruction for sending the specific-type cartridge to the user identified by the received user information, when the second controller receives a response to the transmitted program, from the image recording apparatus via the second communication device.

15. A communication system, comprising:

an image recording apparatus comprising (i) an image recorder configured to cause a recording material to adhere to a recording sheet to record an image, (ii) a connecting portion to which at least one cartridge filled with the recording material is to be removably connected, (iii) a first communication device configured to communicate with a server, (iv) a storage, and (v) a first controller; and the server comprising a second controller and a second communication device configured to communicate with an information processor and the image recording apparatus, the first controller being configured to perform:
  controlling the image recorder to execute a recording processing selectively in one of a first mode and a second mode different from the first mode;
  in the first mode, controlling the image recorder to execute the recording processing when a specific-type cartridge has not been connected to the connecting portion and controlling the image recorder not to execute the recording processing when the specific-type cartridge has been connected to the connecting portion;
  in the second mode, controlling the image recorder to execute the recording processing in any of a case where the specific-type cartridge has not been connected to the connecting portion and a case where the specific-type cartridge has been connected to the connecting portion; and
  controlling the first communication device to transmit identification information relating to the image recording apparatus to the server, the second controller being configured to perform:
  controlling the second communication device to receive user information for identifying a user, from one of the information processor and the image recording apparatus;
  controlling the second communication device to receive the identification information transmitted from one of the information processor and the image recording apparatus;
  in response to receiving the user information and the identification information, controlling the second communication device to transmit a switch instruction to the image recording apparatus, the switch instruction instructing a switch of a mode of the image recording apparatus from the first mode to the second mode; and
  outputting an instruction for sending the specific-type cartridge to the user identified by the received user information, when the second controller receives a response to the transmitted switch instruction, from the image recording apparatus via the second communication device, the first controller being configured to perform:
  controlling the image recorder to execute the recording processing in the first mode in a state in which the switch instruction is not received from the server; and
  controlling the image recorder to execute the recording processing in the second mode when the switch instruction is received from the server.

16. A communication system, comprising:

an image recording apparatus comprising (i) an image recorder configured to cause a recording material to adhere to a recording sheet to record an image, (ii) a connecting portion to which at least one cartridge filled with the recording material is to be removably connected, (iii) a first communication device configured to communicate with a server, (iv) a storage, and (v) a first controller; and the server comprising a second controller and a second communication device configured to communicate with an information processor and the image recording apparatus, the first controller being configured to control the first communication device to transmit identification information relating to the image recording apparatus to the server, the second controller being configured to perform:
  controlling the second communication device to receive user information for identifying a user, from one of the information processor and the image recording apparatus;
  controlling the second communication device to receive the identification information transmitted from one of the information processor and the image recording apparatus;
  controlling the second communication device to transmit a program in response to receiving the user information and the identification information, the program causing the image recorder of the image recording apparatus identified by the identification information, to execute the recording processing regardless of whether a specific-type cartridge has been connected to the connecting portion of the image recording apparatus, the program causing the image recording apparatus to store recording information into the storage of the image recording apparatus, the recording information relating to the recording processing executed when the specific-type cartridge has been connected to the connecting portion of the image recording apparatus; and
  outputting an instruction for sending the specific-type cartridge to the user identified by the received user information, when the second controller receives a response to the transmitted program, from the image recording apparatus via the second communication device, the first controller being configured to perform:
  controlling the first communication device to receive the program transmitted from the server; and
  installing the received program.

17. The communication system according to claim 16, wherein the first controller is configured to:
  before the program transmitted from the server is installed, establishing a first mode in which the first controller controls the image recorder to execute the recording processing when the specific-type cartridge has not been connected to the connecting portion and controls the image recorder not to execute the recording processing when the specific-type cartridge has been connected to the connecting portion; and after the program transmitted from the server is installed, establishing a second mode in which the first controller controls the image recorder to execute the recording processing in any of a case where the specific-type cartridge has not been connected to the connecting portion and a case where the specific-type cartridge has been connected to the connecting portion.

* * * * *